(12) United States Patent
Rofougaran

(10) Patent No.: US 8,359,373 B2
(45) Date of Patent: Jan. 22, 2013

(54) HANDHELD COMPUTING UNIT OF A COMPUTING DEVICE WITH AN EXTENDED COMPUTING UNIT

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 939 days.

(21) Appl. No.: 12/431,475

(22) Filed: Apr. 28, 2009

(65) Prior Publication Data

US 2009/0209288 A1 Aug. 20, 2009

Related U.S. Application Data

(63) Continuation-in-part of application No. 12/026,681, filed on Feb. 6, 2008, now abandoned.

(51) Int. Cl.
*G06F 15/177* (2006.01)
*G06F 3/00* (2006.01)
*G06F 13/00* (2006.01)

(52) U.S. Cl. ............... 709/220; 710/1; 710/303; 713/1

(58) Field of Classification Search .................. None
See application file for complete search history.

(56) References Cited

U.S. PATENT DOCUMENTS

| | | | | |
|---|---|---|---|---|
| 5,371,858 A * | 12/1994 | Miller et al. | | 709/222 |
| 6,170,026 B1 * | 1/2001 | Kimura et al. | | 710/62 |
| 6,438,622 B1 * | 8/2002 | Haghighi et al. | | 710/1 |
| 6,594,051 B1 * | 7/2003 | Chaplin et al. | | 398/139 |
| 7,328,333 B2 * | 2/2008 | Kawano et al. | | 713/1 |

* cited by examiner

*Primary Examiner* — Wen-Tai Lin
(74) *Attorney, Agent, or Firm* — Garlick & Markison; Bruce E. Garlick

(57) ABSTRACT

A handheld computing unit includes a hardware section and memory. The memory includes an application section and an operating system section. The operating system section includes operational instructions that cause the hardware section to: detect a mode change request to a non-standalone mode; determine whether an extended computing unit is engaged with another handheld computing unit; when the extended computing unit is engaged with another handheld unit, initiate a single extended computing unit-multiple handheld computing unit mode; and when the initiation is successful, retrieve a single extended computing unit-multiple handheld computing unit operating system boot loader.

20 Claims, 17 Drawing Sheets

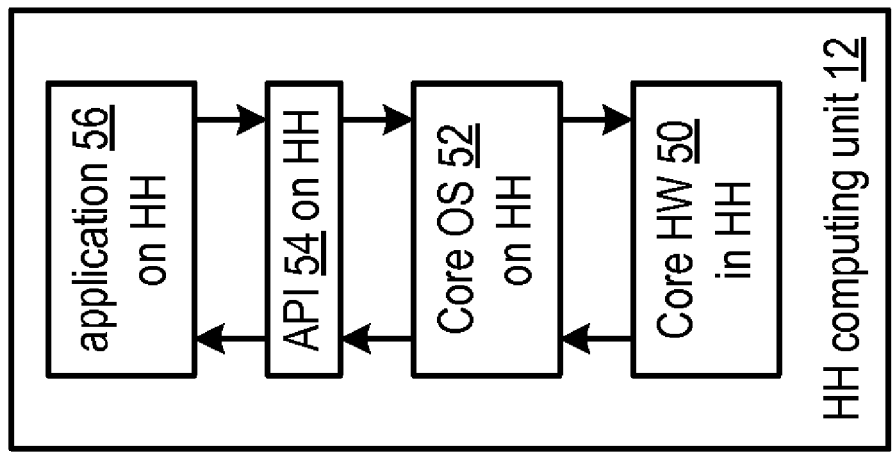
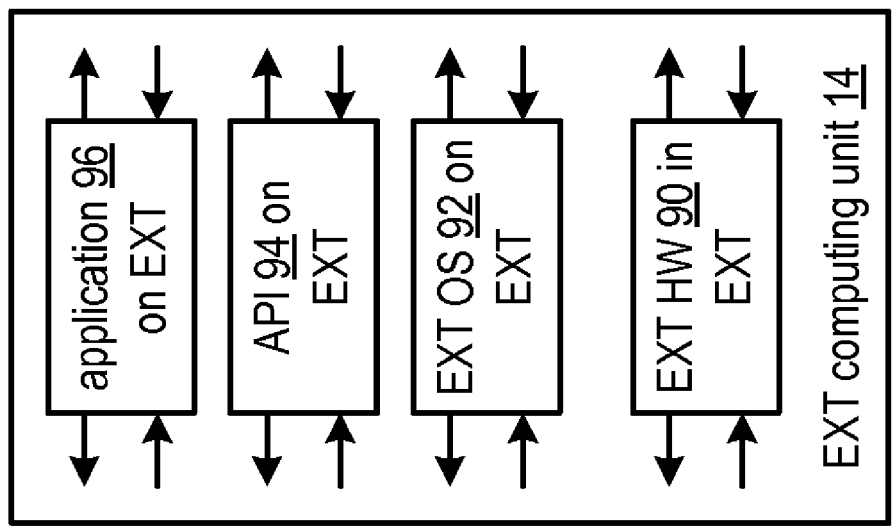
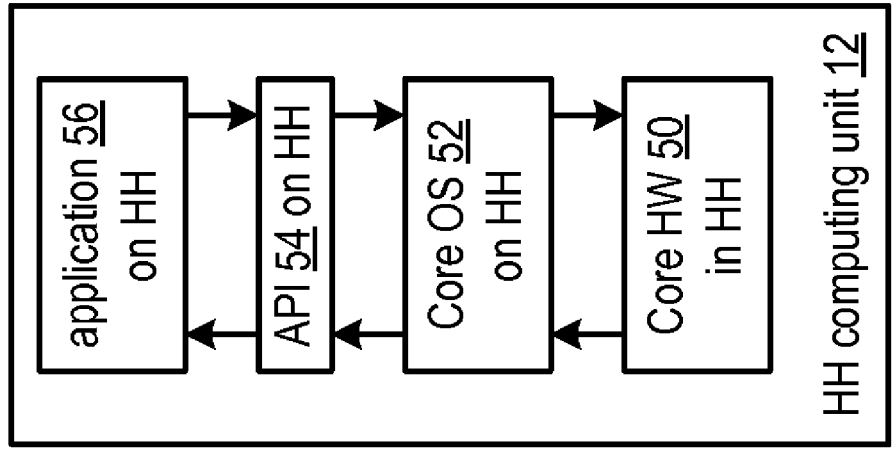
FIG. 8

HANDHELD COMPUTING UNIT OF A COMPUTING DEVICE WITH AN EXTENDED COMPUTING UNIT

This patent application is claiming priority under 37 USC §120 as a continuation in part patent application of patent application entitled COMPUTING DEVICE WITH HANDHELD AND EXTENDED COMPUTING UNITS, having a Ser. No. 12/026,681 and a filing date of Feb. 6, 2008 now abandoned, which is incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to communication systems and more particularly to computing devices used in such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless or wired networks. The wireless and/or wire lined communication devices may be personal computers, laptop computers, personal digital assistants (PDA), cellular telephones, personal digital video players, personal digital audio players, global positioning system (GPS) receivers, video game consoles, entertainment devices, etc.

Many of the communication devices include a similar basic architecture: that being a processing core, memory, and peripheral devices. In general, the memory stores operating instructions that the processing core uses to generate data, which may also be stored in the memory. The peripheral devices allow a user of the communication device to direct the processing core as to which operating instructions to execute, to enter data, etc. and to see the resulting data. For example, a personal computer includes a keyboard, a mouse, and a display, which a user uses to cause the processing core to execute one or more of a plurality of applications.

While the various communication devices have a similar basic architecture, they each have their own processing core, memory, and peripheral devices and provide distinctly different functions. For example, a cellular telephone is designed to provide wireless voice and/or data communications in accordance with one or more wireless communication standards (e.g., IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof). As another example, a personal digital audio player is designed to decompress a stored digital audio file and render the decompressed digital audio file audible.

Over the past few years, integration of the some of the communication device functions into a single device has occurred. For example, many cellular telephones now offer personal digital audio playback functions, PDA functions, and/or GPS receiver functions. Typically, to load one or more of these functions, files, or other applications onto a handheld communication device (e.g., a cellular telephone, a personal digital audio and/or video player, a PDA, a GPS receiver), the handheld communication device needs to be coupled to a personal computer or laptop computer. In this instance, the desired application, function, and/or file is first loaded on to the computer and then copied to the handheld communication device; resulting in two copies of the application, function, and/or file.

To facilitate such loading of the application, function, and/or file in this manner, the handheld communication device and the computer each require hardware and corresponding software to transfer the application, function, and/or file from the computer to the handheld communication device. As such, two copies of the corresponding software exist as well as having two hardware components (one for the handheld device and the second for the computer). In addition to the redundancy of software, timing issues, different versions of the software, incompatible hardware, and a plethora of other reasons cause the transfer of the application, function, and/or file to fail.

In addition to integration of some functions into a single handheld device, handheld digital audio players may be docked into a speaker system to provide audible signals via the speakers as opposed to a headphone. Similarly, a laptop computer may be docked to provide connection to a full size keyboard, a separate monitor, a printer, and a mouse. In each of these docking systems, the core architecture is not changed.

Therefore, a need exists for a computing device that at least partially overcomes one or more of the above mentioned issues.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 8 is a schematic block diagram of an embodiment of multiple handheld computing units in a standalone mode with respect to an extended computing unit in accordance with the present invention;

DETAILED DESCRIPTION OF THE INVENTION

Figure 1:
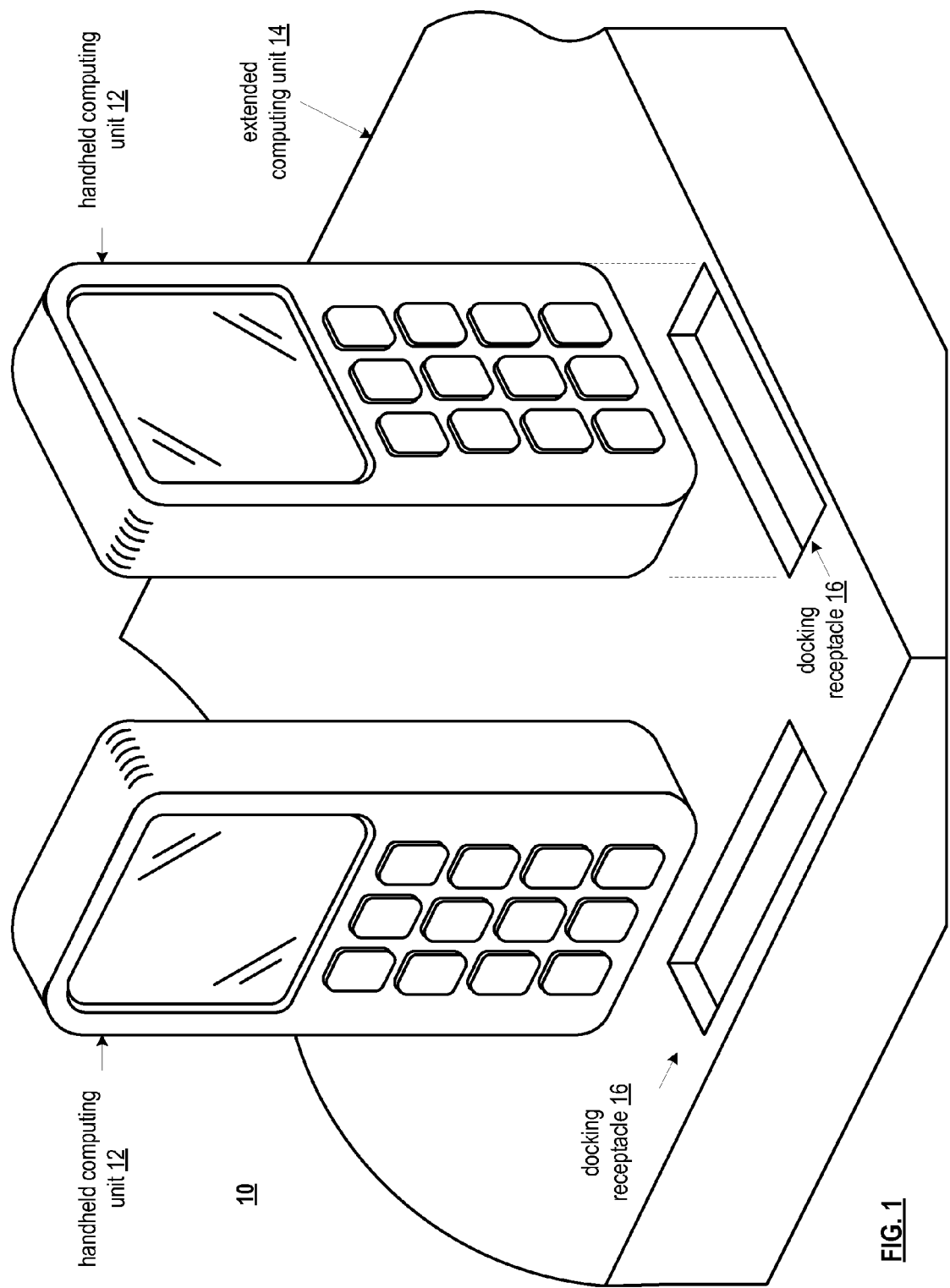
FIG. 1 is a diagram of an embodiment of a computing device that includes multiple handheld computing units and an extended computing unit in accordance with the present invention.

FIG. 1 is a diagram of an embodiment of a computing device 10 that includes multiple handheld computing units 12 (e.g., two or more) and an extended computing unit 14. Each of the handheld computing units 12 may have a form factor similar to a cellular telephone, personal digital assistant, personal digital audio/video player, etc. and includes a connector structure that couples to a docketing receptacle 16 of the extended computing unit 14.

In general, a handheld computing unit 12 includes the primary processing module (e.g., central processing unit), the primary main memory, and the primary hard disk memory for the computing device 10. In this manner, when a single handheld computing unit 12 is coupled to the extended computing unit 14, its functions as the core of the computing device 10, which emulates a personal computer (PC) or laptop computer integrated with other functions such as a cellular telephone, a GPS receiver, a personal digital audio player, a personal digital video player, a personal digital assistant, portable television, and/or any other type of personal handheld electronic device.

In addition, when the handheld computing unit 12 is docked to the extended computing unit 14, files and/or applications can be swapped therebetween. For example, assume that the user of the computing device 10 has created a presentation using presentation software and both reside in memory of the extended computing unit 14. The user may elect to transfer the presentation file and the presentation software to memory of the handheld computing unit 12. If the handheld computing unit 12 has sufficient memory to store the presentation file and application, then it is copied from the extended computing unit memory to the handheld computing unit memory. If there is not sufficient memory in the handheld computing unit, the user may transfer an application and/or file from the handheld computing unit memory to the extended computing unit memory to make room for the presentation file and application.

With the handheld computing unit 12 including the primary components for the computing device 10, there is only one copy of an application and/or of a file to support PC functionality, laptop functionality, and a plurality of handheld device functionality (e.g., TV, digital audio/video player, cell phone, PDA, GPS receiver, etc.). In addition, since only one copy of an application and/or of a file exists (other than desired backups), special software and corresponding hardware to transfer the applications and/or files from a PC to a handheld device are no longer needed. As such, the processing module, main memory, and I/O interfaces of the handheld computing unit 12 provide a single core architecture for a PC and/or a laptop, a cellular telephone, a PDA, a GPS receiver, a personal digital audio player, a personal digital video player, etc.

When multiple handheld computing units 12 are coupled to the extended computing unit 14, one or more separate computing devices 10 are created. For instance, when two handheld computing units 12 (e.g., personal and work handheld (HH) computing units, family members' HH computing units, colleagues HH computing units, video game players' HH computing units, etc.) are coupled to the extended computing unit 12, the HH computing units, in connection with the extended (EXT) computing unit, may for a single computing device, with one or more user interfaces (e.g., one user interface if the HH computing units are used by a single user and multiple user interfaces if the HH computing units are used by different users). As will be described in greater detail with reference to one or more of FIGS. 2-19, one of the HH computing units will initiate a single EXT computing unit-multiple HH computing unit mode, which, when executed, establishes a single core processing unit, a single main memory, and a single hard disk/flash memory using the corresponding components of the HH computing units and the EXT computing units.

In another example, a HH computing unit 12 may initiation a mode where the HH computing units connect to the EXT computing unit, but create separate computing devices 10. In this instance, the separate computing devices operate independently of one another. In yet another example, an HH computing unit 12 may initiate a mode where the HH computing units are connected to the EXT computing unit and form semi-separate computing devices 10. In this instance, the resulting computing units 10 function independently, but share resources (e.g., applications, memory, processing unit, etc.) of the EXT computing unit.

Figure 2:
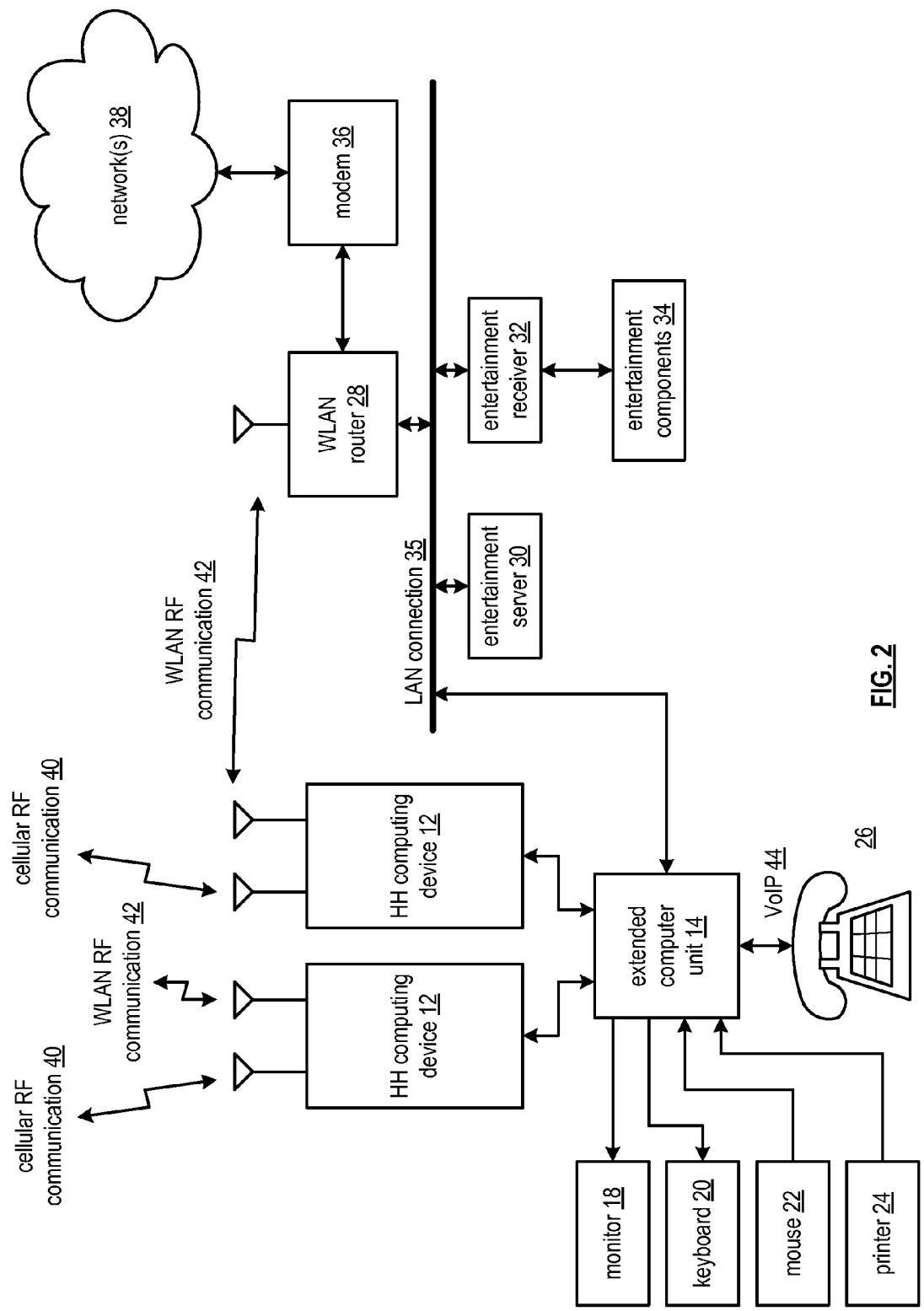
FIG. 2 is a schematic block diagram of an embodiment of multiple handheld computing units docked to an extended computing unit within a communication system in accordance with the present invention.

FIG. 2 is a schematic block diagram of an embodiment of multiple handheld computing units docked to an extended computing unit within a communication system. In this embodiment, the communication system may include one or more of a wireless local area network (WLAN) router 28, a LAN connection 35 (e.g., Ethernet, twisted pair, co-axial cable, wireless, etc.) a modem 36 coupled to one or more networks 38 (e.g., internet, public switched telephone network, other WLANs, wide area networks, etc.), an entertainment server 30 (e.g., a server coupled to database of movies, music, video games, etc.), an entertainment receiver 32, entertainment components 34 (e.g., speaker system, television monitor and/or projector, DVD (digital video disc) player or newer versions thereof, VCR (video cassette recorder), satellite set top box, cable set top box, video game console, etc.), and a voice over internet protocol (VoIP) phone 26. As an alternative or in addition to the WLAN router 28, the system may include a local area network (LAN) router coupled to the extended computing unit 14.

As is also shown, the extended computing unit 14 is coupled to a monitor 18, a keyboard 20, a mouse 22, and a printer 24. The extended computing unit 14 may also be coupled to other devices (not shown) such as a trackball, touch screen, gaming devices (e.g., joystick, game pad, game controller, etc.), an image scanner, a webcam, a microphone, speakers, and/or a headset. In addition, the extended computing unit 14 may have a form factor similar to a personal computer and/or a laptop computer. For example, for in-home or in-office use, having the extended computing unit with a form factor similar to a PC may be desirable. As another example, for traveling users, it may be more desirable to have a laptop form factor.

In this example, two handheld computing units 12 are docked to the extended computer unit 14 and function together to provide one or more computing devices 10. The docking of a handheld computing unit 12 to the extended computing unit 14 encompasses one or more high speed connections between the units 12 and 14. Such a high speed connection may be provided by an electrical connector, by an RF connector, by an electromagnetic connector, and/or a combination thereof. When a single handheld computing 12 is coupled to the extended computing unit, the units 12 and 14 collectively function similarly to a personal computer and/or laptop computer with a WLAN card and a cellular telephone card.

In a single extended (EXT) computing unit-single handheld (HH) computing unit mode, the handheld computing unit 12 may transceive cellular RF communications 40 (e.g., voice and/or data communications). Outgoing voice signals may originate at the VoIP phone 26 as part of a VoIP communication 44 or a microphone coupled to the extended computing unit 14. The outgoing voice signals are converted into digital signals that are subsequently converted to outbound RF signals. Inbound RF signals are converted into incoming digital audio signals and that may be provided to a sound card within the extended computing unit for presentation on speakers or provided to the VoIP phone via as part of a VoIP communication 44.

Outgoing data signals may originate at the mouse 22, keyboard 20, image scanner, etc. coupled to the extended computing unit 14. The outgoing data signals are converted into digital signals that are subsequently converted to outbound RF signals. Inbound RF signals are converted into incoming data signals and that may be provided to the monitor 18, the printer 24, and/or other character presentation device.

In addition, the handheld computing unit 12 may include a WLAN transceiver for coupling to the WLAN router 28 to support WLAN RF communications 42 for the computing device 10. The WLAN communications 42 may be for accessing the internet 38 via modem 36, for accessing the entertainment server, and/or accessing the entertainment receiver 32. For example, the WLAN communications 42 may be used to support surfing the web, receiving emails, transmitting emails, accessing on-line accounts, accessing on-line games, accessing on-line user files (e.g., databases, backup files, etc.), downloading music files, downloading video files, downloading software, etc. As another example, the computing device 10 (i.e., the handheld computing unit 12 and the extended computing unit 14) may use the WLAN communications 42 to retrieve and/or store music and/or video files on the entertainment server; and/or to access one or more of the entertainment components 34 and/or the entertainment receiver 32.

In a single EXT computing unit-multiple HH computing unit mode, multiple HH computing units 12 are coupled to the EXT computing unit 14. The HH computing units 12 and the EXT computing unit 14 may collectively function to provide separate computing units 10, an integrated computing unit 10, or semi-separate computing units 10. Each type of computing unit provides its user with the same functionality as a computing device in the single EXT computing unit-single HH computing unit.

Figure 3:
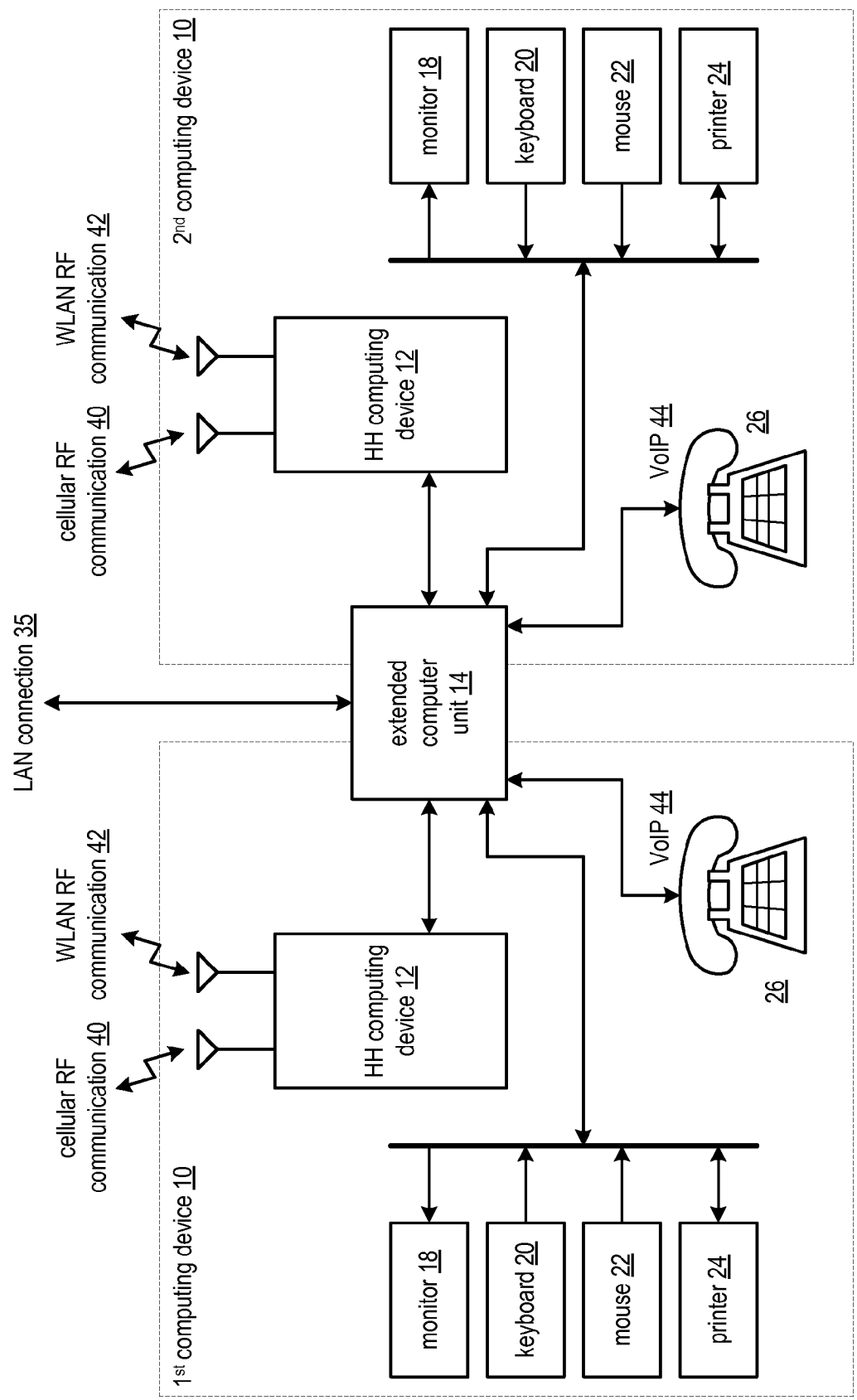
FIG. 3 is a schematic block diagram of another embodiment of multiple handheld computing units docked to an extended computing unit within a communication system in accordance with the present invention.

FIG. 3 is a schematic block diagram of another embodiment of multiple handheld (HH) computing units 12 docked to an extended (EXT) computing unit 14 to produce two separate computing devices 10. The first computing device 10 includes one of the HH computing units 12 coupled to the EXT computing unit 14 and a plurality of user interface components (e.g., one or more monitors 18, a keyboard 20, a mouse 22, a printer 24, microphone, VoIP telephone 26, scanner, track ball, touch screen, joy stick, etc.). The second computing device 10 includes the other HH computing unit 12 coupled to the EXT computing unit 14 and its own plurality of user interface components.

As separate computing devices 10, each device 10 includes virtually separate hardware sections, operating system sections, application programming interface (API) sections, and application sections. In this instance, the memory (e.g., main memory, hard disk, and/or flash memory) is partitioned between the separate computing devices 10. The operating systems of the separate computing devices 10 utilize the partitioned EXT memory in combination with the HH memory as the memory for the computing device. Similarly, the processing resources of the EXT computing unit 14 (e.g., one or more processing modules) are partitioned for separate use. The partitioning may be physical, virtual, or in time. Since the memory is partitioned, the separate computing devices 10 do not share applications, data, etc. If the separate computing devices 10 desire to share applications, data, or other, they must do so using conventional means or re-configuring into semi-separate computing devices 10.

Figure 4:
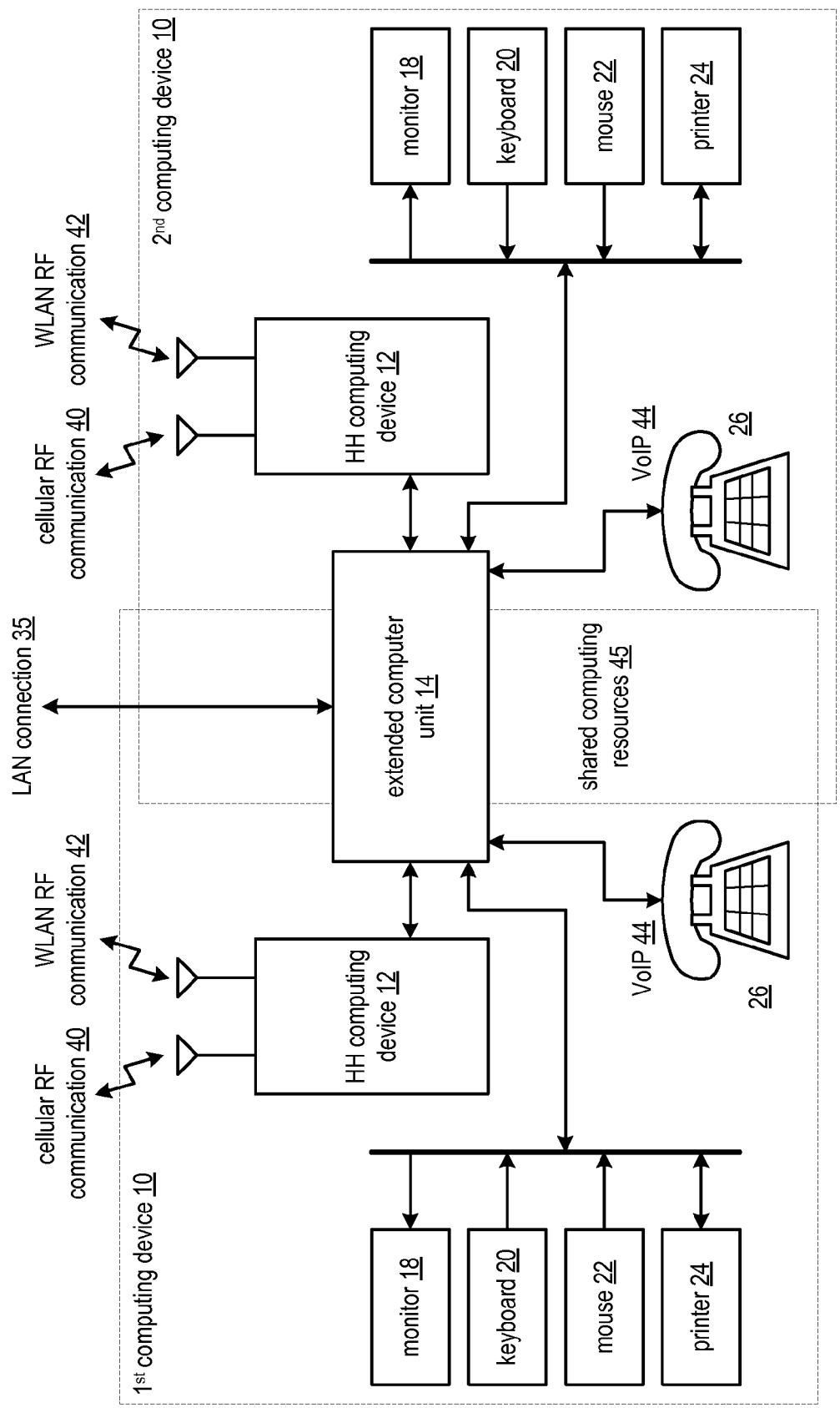
FIG. 4 is a schematic block diagram of another embodiment of multiple handheld computing units docked to an extended computing unit within a communication system in accordance with the present invention.

FIG. 4 is a schematic block diagram of another embodiment of multiple handheld (HH) computing units 12 docked to an extended (EXT) computing unit to produce two semi-separate computing devices 10. The first computing device 10 includes one of the HH computing units 12 coupled to the EXT computing unit 14 and a plurality of user interface components (e.g., one or more monitors 18, a keyboard 20, a mouse 22, a printer 24, microphone, VoIP telephone 26, scanner, track ball, touch screen, joy stick, etc.). The second computing device 10 includes the other HH computing unit 12 coupled to the EXT computing unit 14 and its own plurality of user interface components.

As semi-separate computing devices 10, each device 10 includes virtually separate hardware sections, virtually separate operating system sections, at least partially shared application programming interface (API) sections, and at least partially shared application sections. In this instance, a portion of the memory (e.g., main memory, hard disk, and/or flash memory) is partitioned between the separate computing devices 10 and another portion is shared (e.g., memory storing applications). The operating systems of the separate computing devices 10 utilize the partitioned EXT memory, the shared EXT memory, and the HH memory as the memory for the computing device 10. Similarly, some of the processing resources of the EXT computing unit 14 (e.g., IO interfaces) are partitioned for separate use and some are shared (e.g., processing modules). The partitioning may be physical, virtual, or in time.

Figure 5:
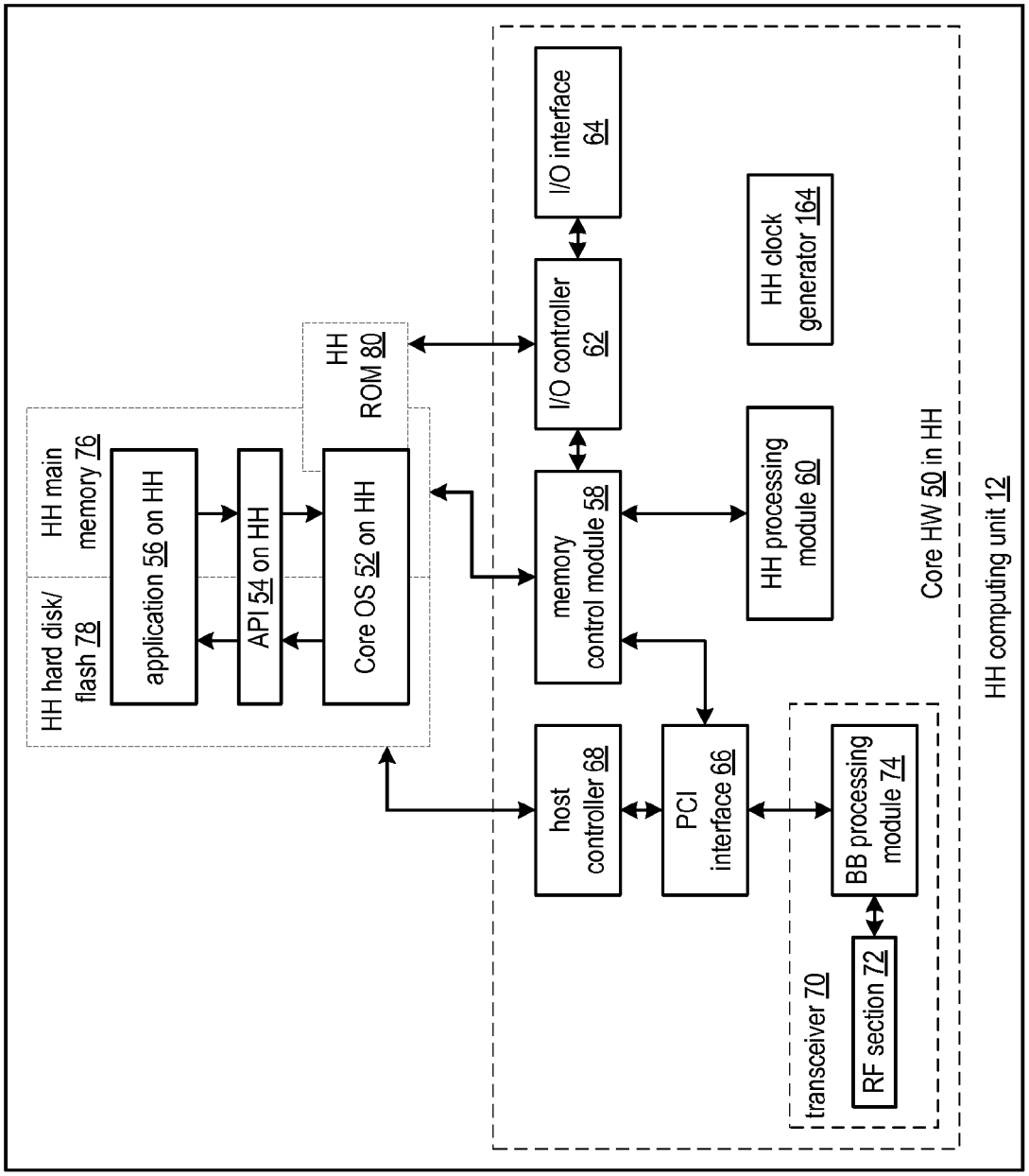
FIG. 5 is a schematic block diagram of an embodiment of a handheld computing unit in accordance with the present invention.

FIG. 5 is a schematic block diagram of an embodiment of a handheld HH computing unit 12 that includes a core hardware (HW) section 50, a core operating system (OS) section 52, an application programming interface (API) section 54, and an application section 56. The HW section 50 includes a memory control module 58, a processing module 60, an input/output (IO) controller 62, an IO interface 64, a PCI interface 66, a host controller 68, and a transceiver 70. The transceiver includes a radio frequency (RF) section 72 and a baseband BB processing module 74. A main memory 76, a hard disk and/or flash memory 78, and a read only memory (ROM) 80 store operational instructions of the OS 52, the API 54, and/or the applications 56.

The processing module 60 and the baseband processing module 74 may be separate processing modules or the same processing module. Such a processing module may be a single processing device or a plurality of processing devices, where a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-19.

The handheld main memory 76 includes one or more RAM integrated circuits (IC) and/or boards. The RAM may be static RAM (SRAM) and/or dynamic RAM (DRAM). The handheld hard disk/flash memory 78 may be one or more of a hard disk, a floppy disk, an optical disk, NOR flash memory, NAND flash memory, and/or any other type of non-volatile memory. The collective memory (e.g., 76 and 78) stores various versions of the operating system 52 (e.g., different versions for different modes of the HH unit and EXT unit), stores the API 54, and stores the applications 56, which include system applications (e.g., input/output device drivers, peripheral device drivers, printer spoolers, video graphics, etc.) and user applications (e.g., database programs, word processing programs, spreadsheet programs, wireless connectivity applications, audio playback programs, video playback programs, video games, etc.).

The handheld ROM 80 stores the basic input/output system (BIOS) program for the various implementations of the computing device 10 (i.e., one or more handheld computing units 12 and the extended computing unit 14 configured as a single EXT unit-single HH unit, as separate devices in a single EXT unit-multiple HH unit mode, as semi-separate devices in another single EXT unit-multiple HH unit mode, or as an integrated device in yet another single EXT unit-multiple HH unit mode). The BIOS also includes a boot loader for the HH unit functioning in a standalone mode. The ROM 80 may be one or more of an electronically erasable programmable ROM (EEPROM), a programmable ROM (PROM), and/or a flash ROM.

The memory control module 58 manages the flow of data to and from the main memory 76. In an embodiment, the memory control module 58 includes a memory controller and a memory interface. When the HH unit is in the standalone mode or when the HH unit is the dominate unit in a single EXT unit-multiple HH units, the memory controller is active to manage the reading and writing of data to and from the main memory of this HH unit, of the EXT unit, and of the other HH unit. Note that, if the main memory includes DRAM (dynamic RAM), the memory controller further includes circuitry to refresh the DRAM.

When the HH unit is not the dominate unit in the single EXT unit-multiple HH units, the memory controller is inactive and the memory interface is active. In this mode, the memory interface does not manage the flow of data to and from the main memories of the units, but facilitates the reading and writing of data to and from its main memory under the direction of another memory controller. The memory interface may include the refresh circuitry for refreshing the DRAM.

A clock generator circuit 164 may be one or more of: a phase locked loop, a crystal oscillator circuit, a fractional-N synthesizer, and/or a resonator circuit-amplifier circuit, where the resonator may be a quartz piezo-electric oscillator, a tank circuit, or a resistor-capacitor circuit. Regardless of the implementation of the clock generator circuit 164, it generates a master clock signal that is provided to the EXT slave clock circuit of the EXT computing unit 14 and generates the clock signals for the handheld computing unit 12. Such clock signals include, but are not limited to, a bus clock, a read/write clock, a processing module clock, a local oscillation, and an I/O clock.

The IO interface 64 includes hardware and/or software for a device or component coupled thereto to access the memory 76 and/or the processing module 60 of the handheld computing unit 12. For example, the interface software may include a driver associated with the device and the hardware may include a signal conversion circuit, a level shifter, etc. The IO interface 64 may include an audio IO interface, a video IO interface, and/or a data IO interface. The audio IO interface may include an audio codec, a volume control circuit, and/or a microphone bias and/or amplifier circuit to couple a handheld (HH) microphone and/or HH speakers. The HH video IO interface may include a video codec, a graphics engine, a display driver, etc. that is coupled to an HH display. The HH data IO interface may include the graphics engine, the display driver, a keypad driver, a touch screen driver, etc. that is coupled to the HH display and/or to an HH keypad.

The IO interface 64 may further support a direct memory access (DMA) controller, interrupt controllers, and a real time clock (e.g., the clock module 164). The IO controller 62 may be coupled to an Ethernet network card, a Redundant Arrays of Inexpensive Disks (RAID), a USB interface, and/or FireWire.

The transceiver 70 provides wireless connectivity for the HH unit 12. The wireless connectivity may be via a cellular telephone application, a short messaging application, a texting application, a wireless local area network (WLAN) application, etc. In an example of the operation, a receiver of the RF section 72 receives an inbound RF signal and amplifies it to produce an amplified inbound RF signal. The receiver may then mix in-phase (I) and quadrature (Q) components of the amplified inbound RF signal with in-phase and quadrature components of a local oscillation to produce a mixed I signal and a mixed Q signal. The mixed I and Q signals are combined to produce an inbound symbol stream. In this embodiment, the inbound symbol may include phase information (e.g., +/−Δθ [phase shift] and/or θ(t) [phase modulation]) and/or frequency information (e.g., +/−Δf [frequency shift] and/or f(t) [frequency modulation]). In another embodiment and/or in furtherance of the preceding embodiment, the inbound RF signal includes amplitude information (e.g., +/−ΔA [amplitude shift] and/or A(t) [amplitude modulation]). To recover the amplitude information, the receiver includes an amplitude detector such as an envelope detector, a low pass filter, etc.

The BB processing module 74 converts the inbound symbol stream into inbound data (e.g., voice, text, audio, video, graphics, etc.) in accordance with one or more wireless communication standards (e.g., GSM, CDMA, WCDMA, HSUPA, HSDPA, WiMAX, EDGE, GPRS, IEEE 802.11, Bluetooth, ZigBee, etc.). Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling. Once converted, the BB processing module 74 provides the inbound data to the processing module 60 and/or to main memory 76.

For transmitted RF signals, the BB processing module 74 receives outbound data from the processing module 60 and/or from main memory 76. The processing module 74 converts the outbound data (e.g., voice, text, audio, video, graphics, etc.) into outbound symbol stream in accordance with one or more wireless communication standards (e.g., GSM, CDMA, WCDMA, HSUPA, HSDPA, WiMAX, EDGE, GPRS, IEEE 802.11, Bluetooth, ZigBee, etc.). Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion.

A transmitter of the RF section 72 receives the outbound symbol stream and converts it into an outbound RF signal that has a carrier frequency within a given frequency band (e.g., 900 MHz, 1800 MHz, 1900 MHz, 2100 MHz, 2.4 GHz, 5 GHz, 29 GHz, 57-66 GHz, etc.). In an embodiment, this may be done by mixing the outbound symbol stream with a local oscillation to produce an up-converted signal. One or more power amplifiers and/or power amplifier drivers amplifies the up-converted signal, which may be RF bandpass filtered, to produce the outbound RF signal. In another embodiment, the transmitter includes an oscillator that produces an oscillation. The outbound symbol stream provides phase information (e.g., +/−Δθ [phase shift] and/or θ(t) [phase modulation]) that adjusts the phase of the oscillation to produce a phase adjusted RF signal, which is transmitted as the outbound RF signal. In another embodiment, the outbound symbol stream includes amplitude information (e.g., A(t) [amplitude modulation]), which is used to adjust the amplitude of the phase adjusted RF signal to produce the outbound RF signal.

In yet another embodiment, the transmitter includes an oscillator that produces an oscillation. The outbound symbol provides frequency information (e.g., +/−Δf [frequency shift] and/or f(t) [frequency modulation]) that adjusts the frequency of the oscillation to produce a frequency adjusted RF signal, which is transmitted as the outbound RF signal. In another embodiment, the outbound symbol stream includes amplitude information, which is used to adjust the amplitude of the frequency adjusted RF signal to produce the outbound RF signal. In a further embodiment, the transmitter section includes an oscillator that produces an oscillation. The outbound symbol provides amplitude information (e.g., +/−ΔA [amplitude shift] and/or A(t) [amplitude modulation]) that adjusts the amplitude of the oscillation to produce the outbound RF signal. Note that the transceiver 70 may transceiver RF signals in a SISO, SIMO, MISO, or MIMO manner, where S represents "single", I represents "input", M represent "multiple", and O represents "output".

In one or more embodiments, the processing module 60, the memory control module 58, the main memory 76, the IO controller 62, the IO interface 64, the PCI interface 66, the host controller 68, the RF transceiver 70 may be implemented on a single integrated circuit, each on separate integrated circuits, or some elements may be implemented on the same integrated circuits. For example, the processing module 60 and the memory control module 58 may be implemented on the same integrated circuit.

Figure 6:
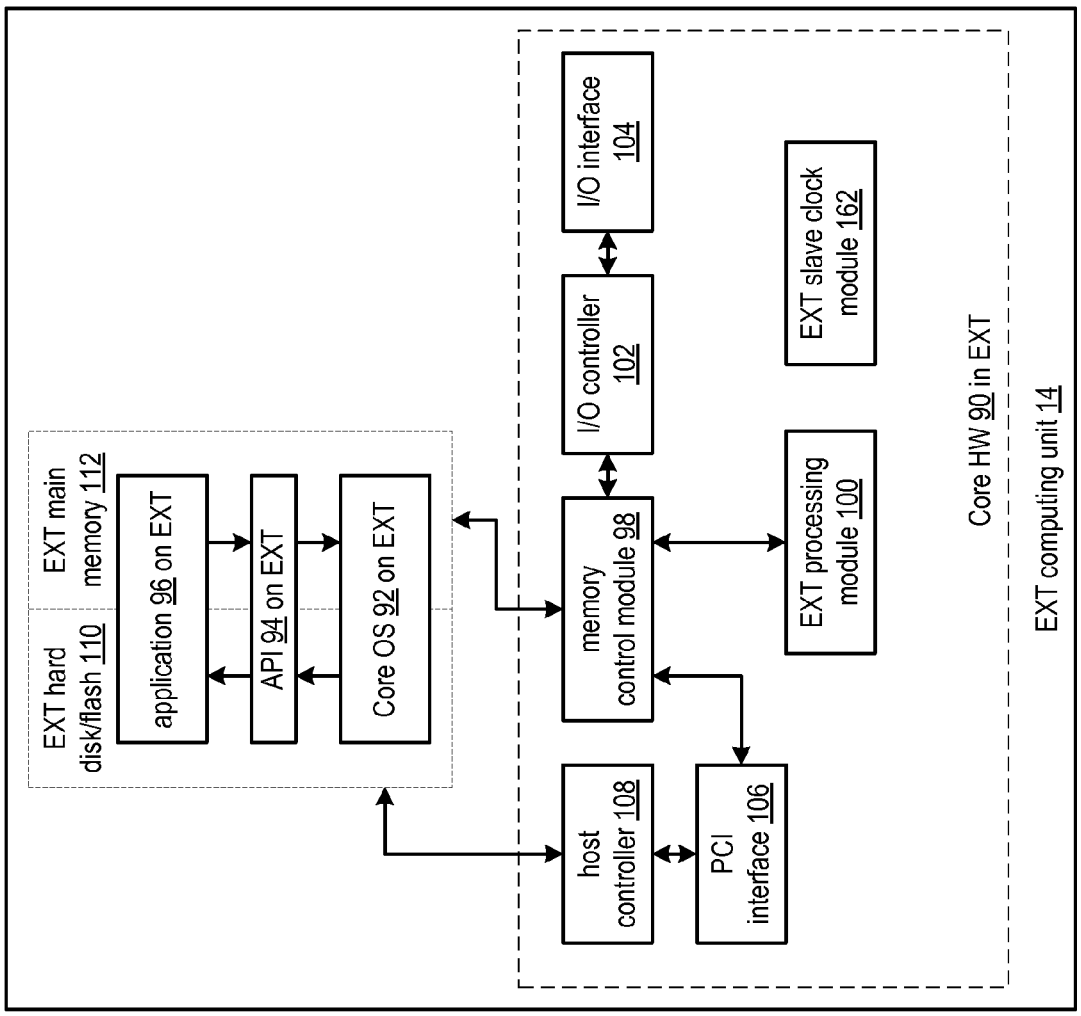
FIG. 6 is a schematic block diagram of an embodiment of an extended computing unit in accordance with the present invention.

FIG. 6 is a schematic block diagram of an embodiment of an extended computing unit 14 that includes an EXT hardware (HW) section 90, EXT main memory 112, and EXT hard disk and/or flash memory 110. The hardware section 90 includes a memory control module 98, a processing module 100, an IO controller 102, an IO interface 104, a PCI interface 106, and a host controller 108. The collective memory (e.g., the EXT main memory 112 and the EXT hard disk/flash memory 110) store operational instructions of a core operating system (OS) section 92, an application programming interface (API) section 94, and an application section 96.

The processing module 100 may be a single processing device or a plurality of processing devices, where a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-19.

The EXT main memory 112 includes one or more RAM integrated circuits (IC) and/or boards. The RAM may be static RAM (SRAM) and/or dynamic RAM (DRAM). The EXT hard disk/flash memory 110 may be one or more of a hard disk, a floppy disk, an optical disk, NOR flash memory, NAND flash memory, and/or any other type of non-volatile memory. The collective memory stores various versions of the operating system 92 (e.g., different versions for different modes of the HH unit and EXT unit), stores the API 94, and stores the applications 96, which include system applications (e.g., input/output device drivers, peripheral device drivers, printer spoolers, video graphics, etc.) and user applications (e.g., database programs, word processing programs, spreadsheet programs, wireless connectivity applications, audio playback programs, video playback programs, video games, etc.).

The memory control module 98 manages the flow of data to and from the main memory 112. In an embodiment, the memory control module 98 includes a memory controller and a memory interface. When the EXT unit is in a single EXT unit-multiple HH unit mode or a single EXT unit-single HH unit, the memory controller may be active to manage the reading and writing of data to and from its main memory and the main memory of one or more HH units. Note that, if the main memory includes DRAM (dynamic RAM), the memory controller further includes circuitry to refresh the DRAM.

When the EXT unit is not activated to manage data flow, the memory controller is inactive and the memory interface is active. In this mode, the memory interface does not manage the flow of data to and from the main memories of the units, but facilitates the reading and writing of data to and from its main memory under the direction of another memory controller. The memory interface may include the refresh circuitry for refreshing the DRAM.

A slave clock module 162 may be one or more of: a phase locked loop, a fractional-N synthesizer, and/or a resonator circuit-amplifier circuit, where the resonator may be a quartz piezo-electric oscillator, a tank circuit, or a resistor-capacitor circuit. Regardless of the implementation of the slave clock module 162, it receives a master clock signal from an HH computing unit and generates, therefrom, clock signals for the EXT computing unit 14. Such clock signals include, but are not limited to, a bus clock, a read/write clock, a processing module clock, a local oscillation, and an I/O clock.

The IO interface 104 includes hardware and/or software for a device or component coupled thereto to access the memory 112 and/or the processing module 100. For example, the interface software may include a driver associated with the device and the hardware may include a signal conversion circuit, a level shifter, etc. The IO interface 104 may include an audio IO interface, a video IO interface, and/or a data IO interface. The audio IO interface may include an audio codec, a volume control circuit, and/or a microphone bias and/or amplifier circuit to couple an EXT microphone and/or EXT speakers. The video IO interface may include a video codec, a graphics engine, a display driver, etc. that is coupled to an EXT display. The data IO interface may include the graphics engine, the display driver, a keyboard driver, a touch screen driver, etc. that is coupled to the display and/or to a keyboard.

The IO interface 104 may further support a direct memory access (DMA) controller, interrupt controllers, and a real time clock (e.g., the clock module 162). The IO controller 102 may be coupled to an Ethernet network card, a Redundant Arrays of Inexpensive Disks (RAID), a USB interface, and/or FireWire.

In one or more embodiments, the processing module 100, the memory control module 98, the main memory 112, the IO controller 102, the IO interface 104, the PCI interface 106, and the host controller 108 may be implemented on a single integrated circuit, each on separate integrated circuits, or some elements may be implemented on the same integrated circuits. For example, the processing module 100 and the memory control module 98 may be implemented on the same integrated circuit.

Figure 7:
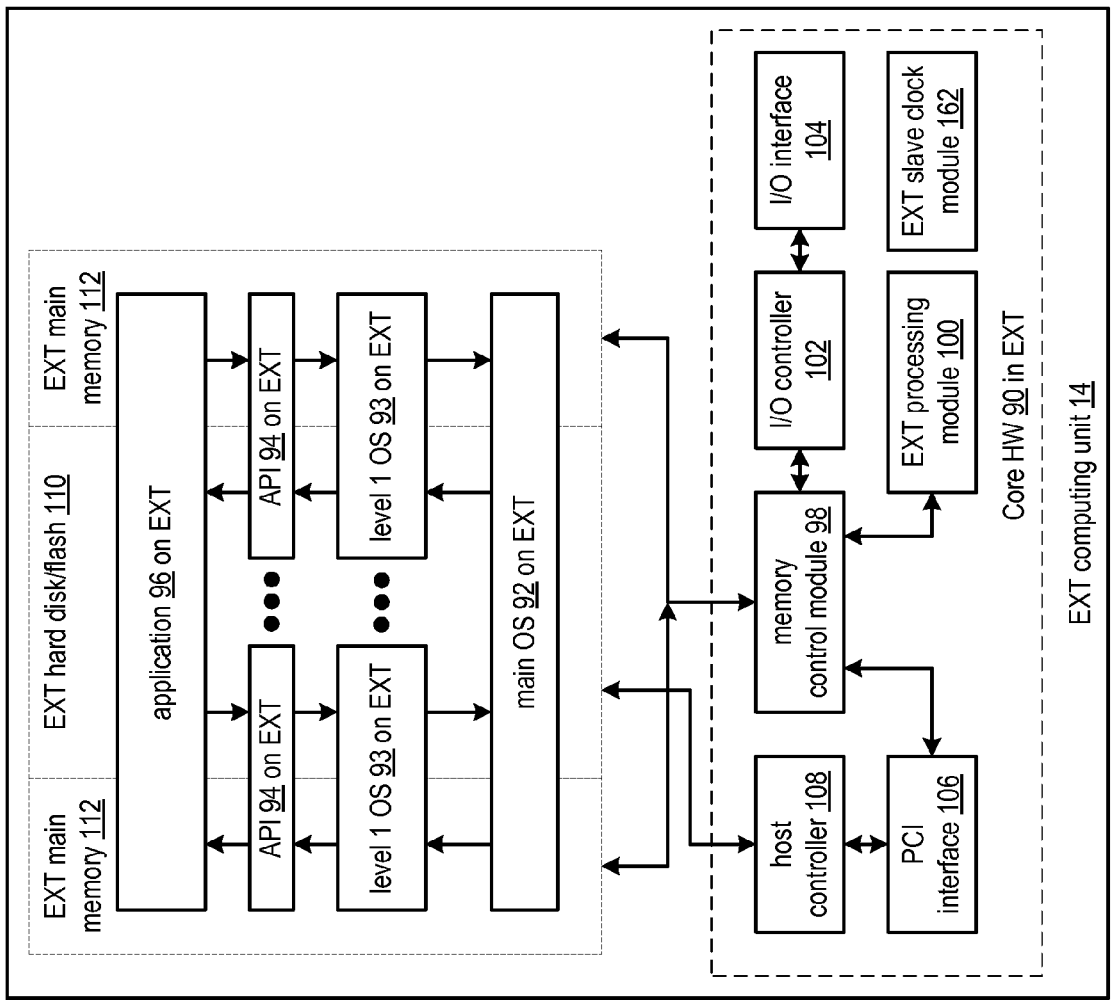
FIG. 7 is a schematic block diagram of another embodiment of an extended computing unit in accordance with the present invention.

FIG. 7 is a schematic block diagram of another embodiment of an extended computing unit 14 that includes an EXT hardware (HW) section 90, EXT main memory 112, and EXT hard disk and/or flash memory 110. The hardware section 90 includes a memory control module 98, a processing module 100, an IO controller 102, an IO interface 104, a PCI interface 106, and a host controller 108. The collective memory (e.g., the EXT main memory 112 and the EXT hard disk/flash memory 110) store operational instructions of a core operating system (OS) section 92, first level operating systems 93, an application programming interface (API) section 94, and an application section 96.

In this embodiment, the operating system is divided into a main operating system and first level operating systems 93 to support separate computing devices 10 (e.g., the EXT computing coupled to two or more HH computing units producing two or more separate computing devices). In this regard, the main operating system provides an interface between the hardware 90 of the EXT unit and the separate first level operating systems 93. The combination of a first level operating system and the main operating system provide the EXT portion of the computing device's operating system.

FIG. 8 is a schematic block diagram of an embodiment of multiple handheld computing units 12 in a standalone mode with respect to an extended computing unit 14. In this instance, each of the HH computing units 12 function as stand-alone mobile devices while the EXT computing unit 14 is substantially non-operational. As shown, the architecture of each of the HH computing units 12 includes vertical functional coupling of the hardware 50, the operating system 52, the API 54, and the applications 56. As is also shown, the EXT computing unit 14 does not include vertical functional coupling since each of the blocks (e.g., hardware 90, operating system 92, API 94, and applications 96) are extensions of the corresponding blocks of one or more of the HH computing units 12.

Figure 9:
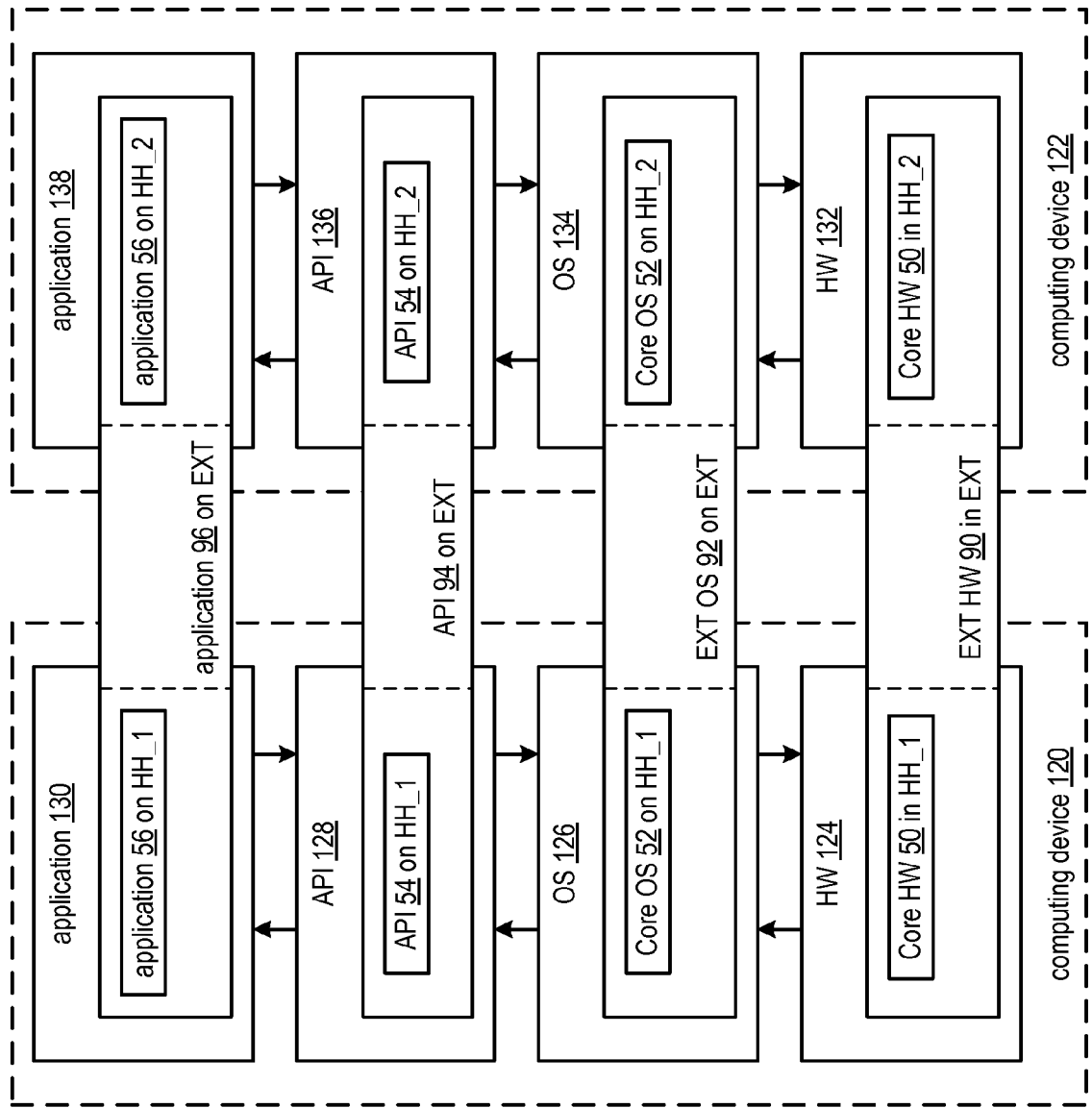
FIG. 9 is a schematic block diagram of an embodiment of multiple handheld computing units in a single extended computing unit-multiple handheld computing unit mode in accordance with the present invention.

FIG. 9 is a schematic block diagram of an embodiment of multiple handheld computing units 12 in a single extended computing unit-multiple handheld computing unit mode. In this diagram, two separate computing devices 120 and 122 are produced by the two HH computing units and one EXT computing unit. Each computing unit 120 and 122 includes computer level applications 130 and 138, computer level application programming interfaces (API) 128 and 136, a computer level operating system 126 and 134, and computer level hardware 124 and 132. Each of the computer level applications 130 and 138 include system applications (e.g., input/output device drivers, peripheral device drivers, printer spoolers, video graphics, etc.) and user applications (e.g., database programs, word processing programs, spreadsheet programs, audio playback programs, video playback programs, etc.).

The hardware 124 and 132 portion of each of the computing devices 10 includes core hardware 50 on the corresponding handheld (HH) computing unit 12 and a partition of the hardware 90 of the EXT computing unit 14. The hardware of the HH computing unit 12 may include one or more of: a radio frequency (RF) section, a baseband processing module, a hard disk and/or flash memory, main memory, a processing module, RAM, ROM, clock circuitry, an audio IO interface, a video IO interface, a data IO interface, and may further include a memory controller. The EXT hardware 90 may include one or more of: a hard disk and/or flash memory, main memory, a co-processing module, RAM, ROM, slave clock circuitry, an audio IO interface, a video IO interface, a data IO interface, and may further include a memory controller. The partitioning of the EXT hardware 90 among the two computing devices 120 and 122 may be done physically (e.g., one processing module for one device, another processing unit for another device, etc.), may be virtual (e.g., allocate the processing module to tasks of either of the HH units via a task manager), or in time (e.g., time division access to the processing module).

The memory may be partitioned to have a first user section and a second user section. The first user section is exclusive for the first computing device 120 and the second user section is exclusive for the second computing device 122.

In this example, the hardware of the corresponding HH computing unit 12 is the core hardware of the corresponding computing device 120 and 122 and the hardware of the EXT computing unit 14 provides an extension of the HH hardware 50. For example, the processing modules of each of the HH computing units 12 may use its partitioning of the processing module of the EXT computing unit 14 as a co-processor(s), as an auxiliary processor(s), as part of a multiple-processor core, or not use it at all. As another example, an HH computing unit 12 may use its partitioning of the main memory of the EXT computing unit 14 as an extension of its main memory, as an auxiliary main memory (e.g., use as a backup copy), as a second layer of cache (e.g., L1 or L2 cache), or not use it at all.

Each of the operating systems 126 includes a core operating system 50 stored in memory of the corresponding HH computing device 12 and an operating system extension 92 stored in the memory of the EXT computing unit 14. The operating system of each of the computing devices 10 is discussed in detail with reference to FIGS. 16-19. In general, the core operating system 50 provides the primary operating system for the computing device 120 and 122 and the EXT operating system 92 augments the primary operating system for further functionality when the HH computing units 12 are docked to the EXT computing units 14.

The computer level API 128 and 136 includes APIs 54 that are stored on the HH computing unit 12 and APIs 94 that are stored on the EXT computing unit 14. Similarly, the computer level applications 130 and 139 include applications 56 that are stored on the HH computing unit 12 and applications 96 stored on the EXT computing unit 14. As described in the parent patent application, applications may reside on the handheld computing unit 12 (e.g., cellular telephone applications) or on the extended computing unit 14. The applications may be swapped therebetween such that, when the HH computing unit 12 is not docked to the EXT computing unit 14, the HH computing unit 12 can store the applications of interest to the user of the HH computing device 12 in a mobile standalone mode (i.e., not docked).

Figure 10:
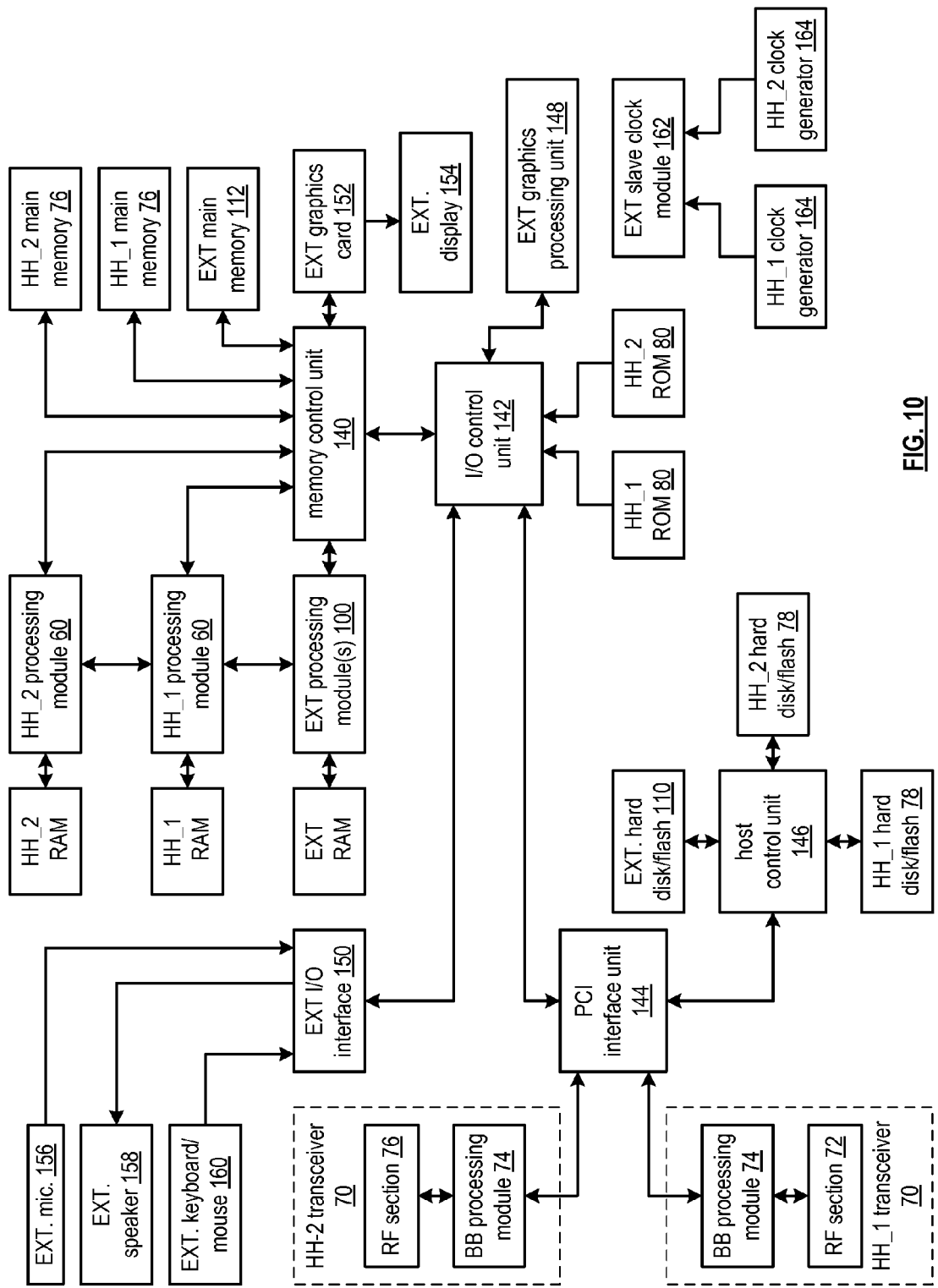
FIG. 10 is a schematic block diagram of another embodiment of multiple handheld computing units in a single extended computing unit-multiple handheld computing unit mode in accordance with the present invention.

FIG. 10 is a schematic block diagram of another embodiment of multiple handheld computing units and an extended computing unit in a single extended computing unit-multiple handheld computing unit mode. In this mode, the multiple HH units (only two shown, but could be more than two) and the extended computing unit form an integrated computing device. The integrated computing device includes the processing modules 60 of the handheld (HH) computing units, the processing module 100 of the extended (EXT) computing unit, the main memories 76 of the HH computing units, the main memory 112 of the EXT computing unit, a memory control unit 140, an EXT graphics card 152, an EXT display 154, an EXT graphics processing unit 148, an EXT IO interface 150, an EXT microphone 156, EXT speakers 158, an EXT keyboard and mouse 160, an IO control unit 142, the ROMs 80 of the HH units, the clock generators 164 of the HH computing units, the slave clock module 162, a PCI interface unit 144, the RF transceivers 70 of the HH computing units, a host control unit 146, the hard disks and/or flash memories of the HH computing units, and the hard disk and/or flash memory of the EXT computing unit.

To establish the integrated computing device, a reboot is initiated by recalling a single EXT unit-multiple HH unit boot loader from one or both of the HH ROMs 80. The single EXT unit-multiple HH unit boot loader, which may be a multiple stage boot loader, points to a single EXT unit-multiple HH unit operating system (OS) section in one or more of the HH main memories 60 and/or in the EXT main memory 112 and to an OS section of one or more of the HH hard disk/flash memories 78 and/or the EXT hard disk/flash memory 110. The single EXT unit-multiple HH unit OS section includes a common OS section and an integrated device OS section. The common OS section includes operating system functions that are common for certain devices, processes, files, and/or applications of the handheld computing unit 12 regardless of the mode and the integrated device OS section includes operating system functions that are unique to certain other devices, processes, files, and/or applications of the handheld computing units and extended computing unit in the integrated computing device mode. Note that the common OS functions may be considered a subset of the single EXT unit-multiple HH unit operating system functions.

When recalled, the single EXT unit-multiple HH unit OS boot loader instructs a designated one of the HH processing modules 60 and/or memory control unit 140, if included within the corresponding designated handheld computing unit 12, to facilitate the transfer of the common OS functions, or at least a portion thereof, and the single EXT unit-multiple HH unit OS functions, or at least a portion thereof, to the combined main memory. The combined main memory has an OS space and a user space. The OS space is used to store the current mode OS, which, in this example, is the single EXT unit-multiple HH unit mode operating system. Note that the OS space may vary in size depending on which operating system is being loaded and further note that the OS space is a privileged memory section that is accessible only to the processing modules 60 and 100 when in an operating system kernel mode. Once the single EXT unit-multiple HH unit OS is loaded in the combined main memory, the OS may initiate a graphical user interface and a log in procedure.

When the integrated computing device 10 has loaded the OS and is executing one or more user applications (e.g., word processing, spreadsheet processing, presentation processing, email, web browsing, database, calendar, video games, digital audio playback, digital video playback, digital audio record, digital video record, video games, contact management program, notes, web favorites, money management program, etc.), the HH processing modules 60 and the EXT processing module 100 function as a multiprocessing module (or as a primary processing module and co-processing modules) and the HH and EXT main memories 76 and 112 function as combined main memory. In addition, the HH hard disk/flash memories 78 and the EXT hard disk/flash memory 110 function as a combined hard disk/flash memory.

In this configuration, the processing modules 60 and 100 may share tasks and/or execute multiple concurrent software processes. Further, the processing modules 60 and 100 may be equal; one may be reserved for one or more special purposes; may be tightly coupled; may be loosely coupled; etc. For example, at the operating system level, one of the HH processing modules 60 may be designated to respond to all interrupts, traps, and/or services calls and the invoke the other HH processing module 60 and/or the EXT processing module 100 as needed. As another example, at the user level, the processing modules 60 and 100 may function in a symmetrical multiprocessing mode, in an asymmetrical multiprocessing mode, in a non-uniform memory access multiprocessing mode, and/or in a clustered multiprocessing mode.

With respect to instruction and data streams, the processing modules 60 and 100 may execute a single sequence of instructions in multiple contexts (single-instruction, multiple-data or SIMD), multiple sequences of instructions in a single context (multiple-instruction, single-data or MISD), or multiple sequences of instructions in multiple contexts (multiple-instruction, multiple-data or MIMD).

The computing device 10 incorporates a virtual memory technique, overlays, and/or swapping to utilize the combined main memories and hard disk/flash memories for one or more user applications and/or system applications. In an embodiment, the virtual memory is divided into pages (e.g., a 4K-Byte block), where one or more page tables (e.g., one for the computing device, one for each running user application, etc.) translates virtual addresses into a physical addresses. Note that the memory control unit 140 manages accesses to the one or more page tables to facilitate the fetching of data and/or instructions from physical memory. If a page table indicates that a page is not currently in main memory, the memory control unit and/or one of the processing modules 60 and/or 100 raise a page fault interrupt. Further note that the memory control unit 140 may be a separate memory controller included in the EXT unit or in one of the HH units to facilitate the single EXT unit-multiple HH unit mode or may be one or more of the memory controllers of the EXT unit and HH unit as will be further discussed with reference to FIGS. 11-14.

A paging supervisor of the operating system receives the page fault interrupt and, in response, searches for the desired page containing the required virtual address. Once found, the paging supervisor reads the page into main memory and updates the appropriate page table. If there is insufficient room the main memory, the paging supervisor saves an area of the main memory to the HH or EXT hard disk/flash memory and updates the corresponding page table. The cleared area of main memory is then used for the new page.

With respect to user I/O devices, HH microphones, HH speakers, HH displays and HH keypads may be disabled while the handheld computing units are coupled to the EXT computing device as an integrated computing device. In this mode, the EXT microphone 156, the EXT speaker 158, the EXT display 154, and the EXT keyboard/mouse 160 are active to provide, via the EXT IO interface 150 and the EXT graphics card 152 or the EXT graphics processing unit 148, the user interfaces to the integrated computing device 10. Note that for a cellular voice telephone call from either transceiver 70, the inbound and outbound voice signals may be provided to/from the EXT microphone 156 and the speaker 158, an EXT headset (not shown), or the VoIP phone 46. Further note that the IO control unit 142, the PCI interface unit 144, and the host control unit 146 may each be separate components included in one of the units 12 and 14 to support the single EXT unit-multiple HH unit mode or may be one or more of the corresponding components of the units 12 and 14 as further discussed with reference to FIGS. 11-14.

Figure 11:
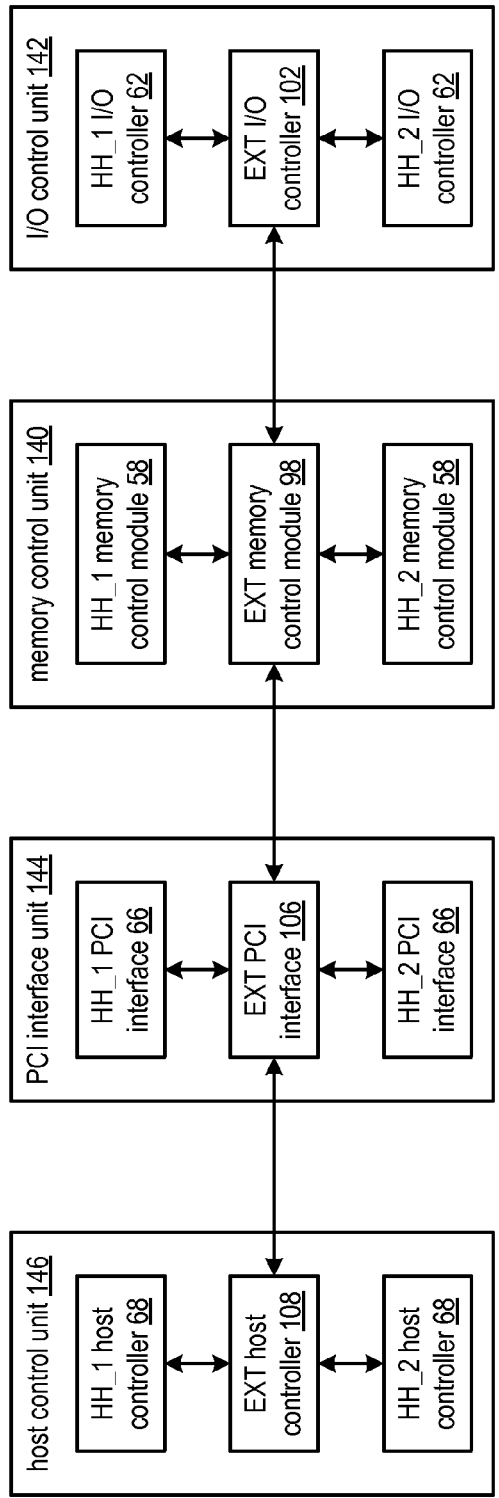
FIG. 11 is a schematic block diagram of an embodiment of interconnection of multiple handheld computing units to an extended computing unit in accordance with the present invention.

FIG. 11 is a schematic block diagram of an embodiment of the interconnections of the memory control unit 140, the IO control unit 142, the PCI interface 144, and the host control unit 146 of multiple handheld computing units 12 coupled to an extended computing unit 14 to support one of the single EXT unit-multiple HH unit modes (e.g., integrated computing device, separate computing devices, semi-separate computing devices). The memory control unit 140 includes the memory control modules 58 of the HH computing units 12 and the memory control module 98 of the EXT computing unit 14. The IO control unit 142 includes the IO controllers 62 of the HH computing units 12 and the IO controller 102 of the EXT unit 14. The PCI interface unit 144 includes the PCI interface 66 of the HH units 12 and the PCI interface 106 of the EXT unit 14. The host control unit 146 includes the host controllers 68 of the HH units 68 and the host controller 108 of the EXT unit 14.

Within the memory control unit 140, the EXT memory control module 98 is coupled to each of the memory control modules 58 of the HH units. As previously mentioned, each of the memory control modules 58 and 98 may include a memory controller and a memory interface. In one example of the memory control unit 140, the memory controller of one of the memory control modules manages the data flow to and from the collective main memory (e.g., the main memories 76 of the HH units 12 and the main memory 112 of the EXT unit 14) and the memory interfaces of the other memory control modules function as interfaces to their respective main memories at the direction of the active memory controller.

In another example of the memory control unit 140, the memory controllers of the memory control modules 58 and 98 function collectively to manage data flow to and from the main memory, with one of the memory controllers functioning as a dominate memory controller. For instance, when a memory access request is received, the memory controller associated with the main memory being addressed is the dominate memory controller and performs the corresponding memory control function.

In an instance where the memory access request is requesting access to two or more main memories, the dominate memory controllers processes the memory access request. Such processing includes determining which main memories are involved. When the main memory of the dominate memory controller is addressed, the dominate memory controller manages the portion of the data flow to and from its main memory.

When the main memory of another memory controller is addressed, the dominate memory controller sends a memory access request to the other memory controller(s). The other memory controller(s) process the request as a normal memory access request, but provides the response to the dominate memory controller. Note that the memory control module 58 of one of the HH units communicates with the memory control module 58 of the other HH unit via the EXT memory control unit 98. For example, when the HH_1 memory controller 58 provides the dominate memory controller, memory access requests regarding the main memory of HH_2 unit are provided to the EXT memory control module 98, which forwards the request to the HH_2 memory control module 58.

Within the IO control unit 142, the EXT IO controller 102 is coupled to each of the IO controllers 62 of the HH units. In one example of the IO control unit 142, the IO controller of one of the HH units or the EXT unit manages the data flow to and from IO components (e.g., ROM, displays, microphones, speakers, keyboard, keypad, mouse, etc.) and the IO controllers function as interfaces to their respective IO components at the direction of the dominate IO controller. In another example of the IO control unit 142, the IO controllers 62 and 102 function collectively to manage data flow to and from the IO components.

Within the PCI interface unit 144, the EXT PCI interface 106 is coupled to each of the PCI interfaces 66 of the HH units. In one example of the PCI unit 144, one of the PCI interfaces 66 and 106 manages memory and/or processing requests of the peripheral components of the integrated computing device 10. This includes memory access requests to the hard disk and/or flash memory via the host controllers 68 and 108. In this example, the other PCI interfaces 66 and 106 function as buffers for their respective peripheral components at the direction of the active PCI interface.

In another example of the PCI interface unit 144, the PCI interfaces 66 and 106 function collectively to manage memory and/or processing requests of the peripheral components, with one of the PCI interfaces functioning as a dominate PCI interface. Note that the PCI interface 66 of one of the HH units communicates with the PCI interface 66 of the other HH unit via the EXT PCI interface 106.

Within the host control unit 146, the EXT host controller 108 is coupled to each of the host controllers 68 of the HH units. In one example of the host control unit 146, one of the host controllers 68 and 108 manages memory access requests to and from the hard disk and/or flash memory (e.g., hard disk/flash memories 78 and 110). In this example, the other host controllers 68 and 108 function as buffers for their respective hard disk/flash memory at the direction of the active host controller.

In another example of the host control unit 146, the host controllers 68 and 108 function collectively to manage memory access requests to and from the hard disk and/or flash memory, with one of the host controllers functioning as a dominate host controller. Note that the host controller 68 of one of the HH units communicates with the host controller 68 of the other HH unit via the EXT host controller 108. Note that, in this embodiment, the HH units 12 and the EXT unit 14 include connectors to facilitate the coupling therebetween.

Figure 12:
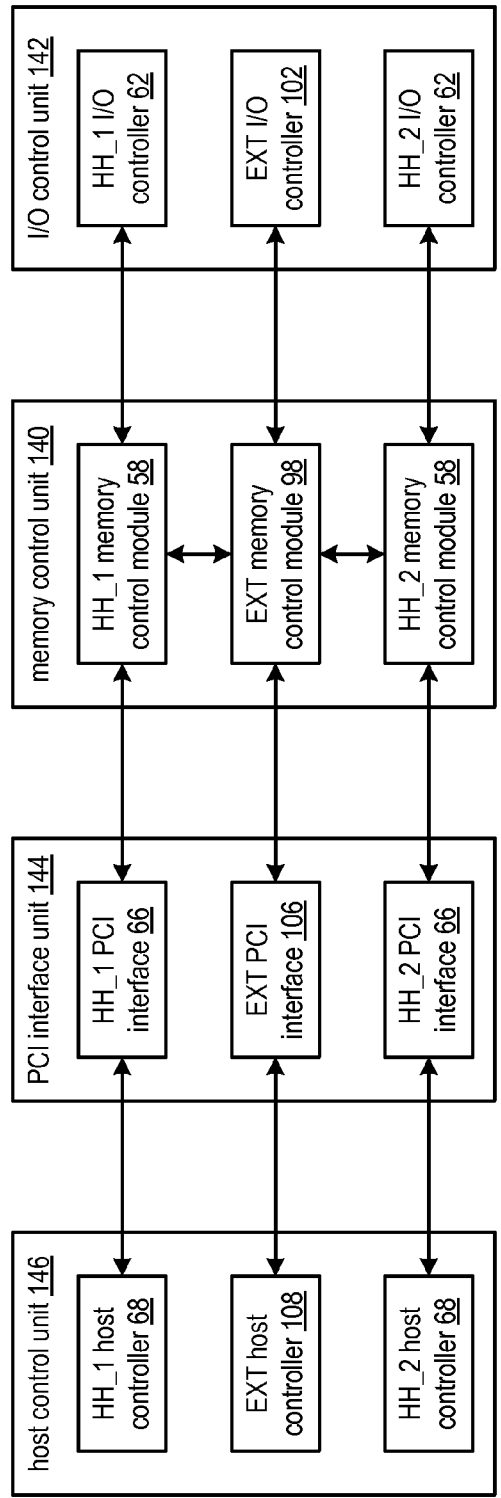
FIG. 12 is a schematic block diagram of another embodiment of interconnection of multiple handheld computing units to an extended computing unit in accordance with the present invention.

FIG. 12 is a schematic block diagram of another embodiment of the interconnections of the memory control unit 140, the IO control unit 142, the PCI interface 144, and the host control unit 146 of multiple handheld computing units 12 coupled to an extended computing unit 14 to support one of the single EXT unit-multiple HH unit modes (e.g., integrated computing device, separate computing devices, semi-separate computing devices). The memory control unit 140 includes the memory control modules 58 of the HH computing units 12 and the memory control module 98 of the EXT computing unit 14. The IO control unit 142 includes the IO controllers 62 of the HH computing units 12 and the IO controller 102 of the EXT unit 14. The PCI interface unit 144 includes the PCI interface 66 of the HH units 12 and the PCI interface 106 of the EXT unit 14. The host control unit 146 includes the host controllers 68 of the HH units 68 and the host controller 108 of the EXT unit 14.

In this embodiment, the inter-coupling between HH computing units 12 and the EXT unit 14 occurs in the memory control unit 140. Thus, if an application is running where data is received via the EXT IO controller 102 and is to be stored in the hard disk/flash memory of the first HH computing unit 12, the data is routed from the EXT IO controller 102 to the EXT memory control module 98. The EXT memory control module 98 provides the data to the HH_1 memory control module 58, which, in turn, provides the data to the HH_1 PCI interface 66. The HH_1 PCI interface 66 provides the data to the HH_1 host controller 68 for storage in the HH_1 hard disk/flash memory.

Figure 13:
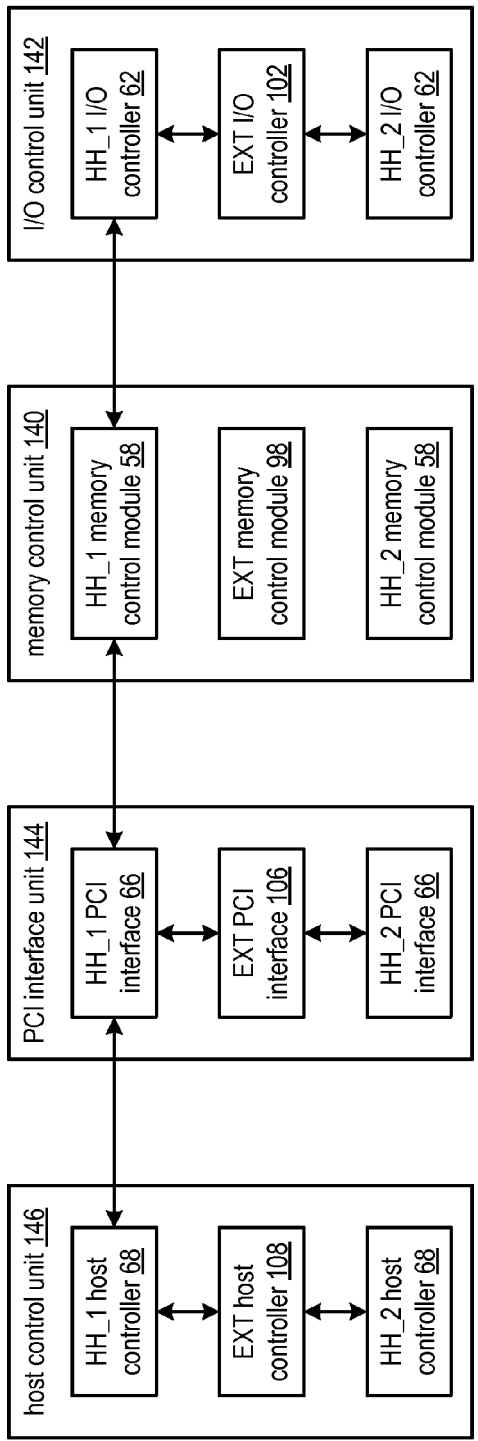
FIG. 13 is a schematic block diagram of another embodiment of interconnection of multiple handheld computing units to an extended computing unit in accordance with the present invention.

FIG. 13 is a schematic block diagram of another embodiment of the interconnections of the memory control unit 140, the IO control unit 142, the PCI interface 144, and the host control unit 146 of multiple handheld computing units 12 coupled to an extended computing unit 14 to support one of the single EXT unit-multiple HH unit modes (e.g., integrated computing device, separate computing devices, semi-separate computing devices). The memory control unit 140 includes the memory control modules 58 of the HH computing units 12 and the memory control module 98 of the EXT computing unit 14. The IO control unit 142 includes the IO controllers 62 of the HH computing units 12 and the IO controller 102 of the EXT unit 14. The PCI interface unit 144 includes the PCI interface 66 of the HH units 12 and the PCI interface 106 of the EXT unit 14. The host control unit 146 includes the host controllers 68 of the HH units 68 and the host controller 108 of the EXT unit 14.

In this embodiment, only the HH_1 memory control module 58 is enabled as a memory controller within the memory control unit 140. As such, the HH_1 memory control module 58 provides the memory control functionality for the computing device regardless of which main memory is being accessed and which processing module is executing an operational instruction. In addition, the HH_1 memory control module 58 provides the conduit for integration of the processing modules, main memories, the user interface components, and the hard disk/flash memories of the integrated computing device, of the separate computing devices, and/or of the semi-separate computing devices.

Also in this embodiment, the EXT memory control module 98 and the HH_2 memory control module 58 are active only to provide an interface to their respective processing modules and respective main memories. As such, they do not provide memory control functionality, hence the lack of connection lines in the example diagram.

Figure 14:
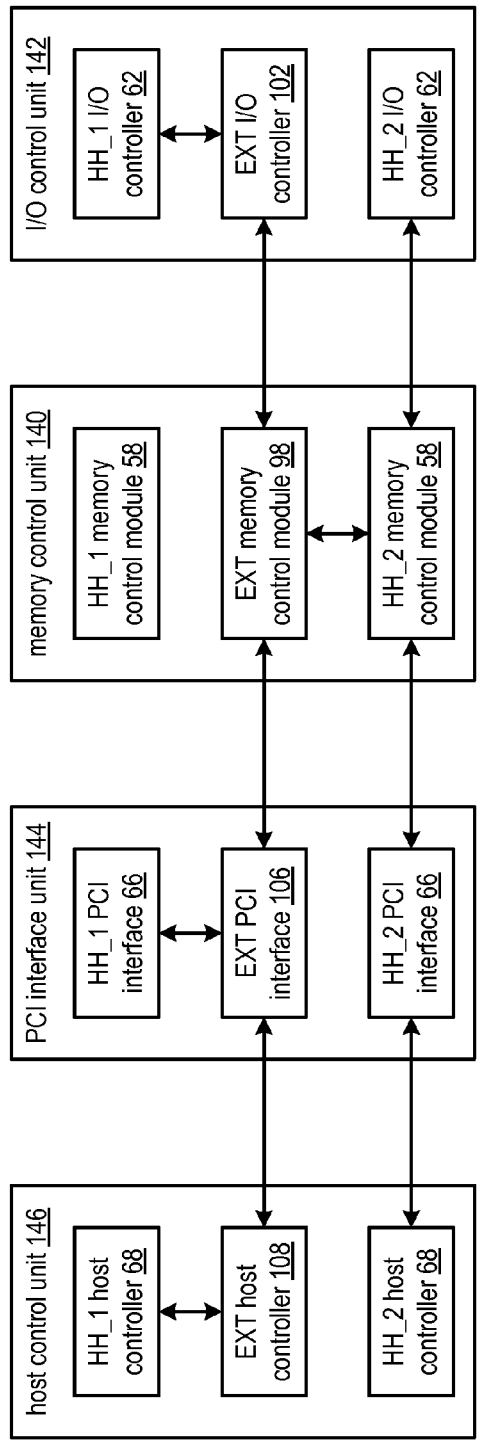
FIG. 14 is a schematic block diagram of another embodiment of interconnection of multiple handheld computing units to an extended computing unit in accordance with the present invention.

FIG. 14 is a schematic block diagram of another embodiment of the interconnections of the memory control unit 140, the IO control unit 142, the PCI interface 144, and the host control unit 146 of multiple handheld computing units 12 coupled to an extended computing unit 14 to support one of the single EXT unit-multiple HH unit modes (e.g., integrated computing device, separate computing devices, semi-separate computing devices). The memory control unit 140 includes the memory control modules 58 of the HH computing units 12 and the memory control module 98 of the EXT computing unit 14. The IO control unit 142 includes the IO controllers 62 of the HH computing units 12 and the IO controller 102 of the EXT unit 14. The PCI interface unit 144 includes the PCI interface 66 of the HH units 12 and the PCI interface 106 of the EXT unit 14. The host control unit 146 includes the host controllers 68 of the HH units 68 and the host controller 108 of the EXT unit 14.

In this embodiment, only the HH_2 memory control module 58 and the EXT memory controller module are enabled as memory controllers within the memory control unit 140. As such, the HH_2 memory control module 58 and the EXT memory control module 98 provide the memory control functionality for the computing device regardless of which main memory is being accessed and which processing module is executing an operational instruction. In addition, the HH_2 memory control module 58 and the EXT memory control module 98 provide the conduit for integration of the processing modules, main memories, the user interface components, and the hard disk/flash memories of the integrated computing device, of the separate computing devices, and/or of the semi-separate computing devices.

Also in this embodiment, the HH_1 memory control module 58 is active only to provide an interface to its respective processing module and respective main memory. As such, it does not provide memory control functionality, hence the lack of connection lines in the example diagram.

Figure 15:
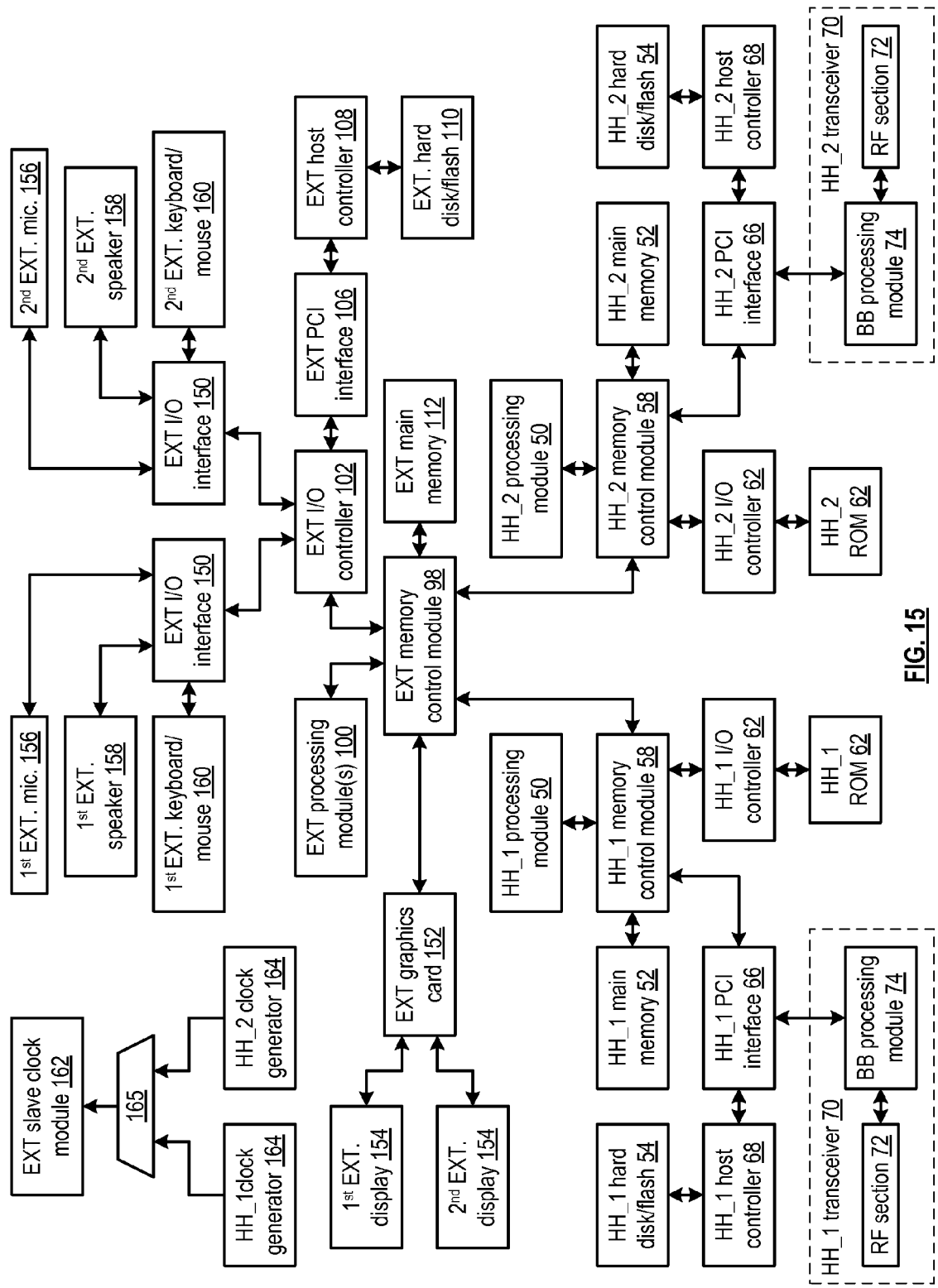
FIG. 15 is a schematic block diagram of another embodiment of multiple handheld computing units in a single extended computing unit-multiple handheld computing unit mode in accordance with the present invention.

FIG. 15 is a schematic block diagram of another embodiment of multiple handheld computing units 12 and the extended computing unit coupled as separate computing devices or semi-separate computing devices mode in accordance with a corresponding single extended computing unit-multiple handheld computing unit mode. In this mode, the multiple HH units (only two shown, but could be more than two) and the extended computing unit form separate or semi-separate computing devices. One of the separate or semi-separate computing device includes the processing module 60 of the first handheld (HH) computing units, a partitioning of the processing module 100 of the extended (EXT) computing unit, the main memory 76 of the first HH computing units, a partitioning (or partially shared for the semi-separate mode) of the main memory 112 of the EXT computing unit, the memory control module 58 of the first HH unit, a partitioning (or sharing for the semi-separate mode) of the EXT memory control module 98, a partitioning of the EXT graphics card 152, an EXT display 154, a partitioning of the EXT graphics processing unit 148, a partitioning of the EXT IO interface 150, an EXT microphone 156, EXT speakers 158, an EXT keyboard and mouse 160, a partitioning of the IO control unit 102, HH_1 ROM 80, HH_1 clock generator 164, a partitioning of the EXT PCI interface 106, HH_1 RF transceiver 70, a partitioning of the EXT host controller 108, HH_1 hard disk and/or flash memory 54, and a partitioning the EXT hard disk and/or flash memory 110.

The other separate or semi-separate computing device includes the processing module 60 of the second handheld (HH) computing units, a partitioning of the processing module 100 of the extended (EXT) computing unit, the main memory 76 of the second HH computing units, a partitioning (or partially shared for the semi-separate mode) of the main memory 112 of the EXT computing unit, the memory control module 58 of the second HH unit, a partitioning (or sharing for the semi-separate mode) of the EXT memory control module 98, a partitioning of the EXT graphics card 152, a second EXT display 154, a partitioning of the EXT graphics processing unit 148, a partitioning of the EXT IO interface 150, a second EXT microphone 156, second EXT speakers 158, a second EXT keyboard and mouse 160, a partitioning of the IO control unit 102, HH_2 ROM 80, HH_2 clock generator 164, a partitioning of the EXT PCI interface 106, HH_2 RF transceiver 70, a partitioning of the EXT host controller 108, HH_2 hard disk and/or flash memory 54, and a partitioning the EXT hard disk and/or flash memory 110.

To establish the separate or semi-separate computing devices, a reboot is initiated by recalling a single EXT unit-multiple HH unit boot loader from both of the HH ROMs 80 (one for one computing device, the other for the other computing device). The single EXT unit-multiple HH unit boot loader, which may be a multiple stage boot loader, points to a single EXT unit-multiple HH unit operating system (OS) section in the HH main memory 60 of the corresponding HH unit and/or in the EXT main memory 112 and to an OS section of the HH hard disk/flash memories 78 of the corresponding HH unit and/or the EXT hard disk/flash memory 110. The single EXT unit-multiple HH unit OS section includes a common OS section and a separate or semi-separate device OS section. The common OS section includes operating system functions that are common for certain devices, processes, files, and/or applications of the handheld computing unit 12 regardless of the mode and the separate or semi-separate device OS section includes operating system functions that are unique to certain other devices, processes, files, and/or applications of the handheld computing units and extended computing unit in the separate or semi-separate computing device mode. Note that the common OS functions may be considered a subset of the single EXT unit-multiple HH unit operating system functions.

When recalled, each of the single EXT unit-multiple HH unit OS boot loader instructs the HH processing module 60 or memory control module 58 of the corresponding HH unit to facilitate the transfer of the common OS functions, or at least a portion thereof, and the single EXT unit-multiple HH unit OS functions, or at least a portion thereof, to the combined main memory (e.g., the HH main memory and a partitioning of the EXT main memory). The combined main memory has an OS space and a user space. The OS space is used to store the current mode OS, which, in this example, is the single EXT unit-multiple HH unit mode operating system. Note that the OS space may vary in size depending on which operating system is being loaded and further note that the OS space is a privileged memory section that is accessible only to the processing modules 60 and 100 when in an operating system kernel mode. Once the single EXT unit-multiple HH unit OS is loaded in the combined main memory, the OS may initiate a graphical user interface and a log in procedure.

When a separate computing device 10 has loaded the OS and is executing one or more user applications (e.g., word processing, spreadsheet processing, presentation processing, email, web browsing, database, calendar, video games, digital audio playback, digital video playback, digital audio record, digital video record, video games, contact management program, notes, web favorites, money management program, etc.), the corresponding HH processing module 60 and the partitioning of the EXT processing module 100 (e.g., partitioned in time, physically, or per task) function as a multiprocessing module (or as a primary processing module and a co-processing module) and the HH main memory 76 and the partitioning of the EXT main memory function as combined main memory. In addition, the HH hard disk/flash memory 78 and the partitioning of the EXT hard disk/flash memory 110 function as a combined hard disk/flash memory.

In this configuration, the HH processing module 60 and the partitioning of the EXT processing module 100 may share tasks and/or execute multiple concurrent software processes. Further, the HH processing module 60 and the partitioning of the EXT processing module 100 may be equal; one may be reserved for one or more special purposes; may be tightly coupled; may be loosely coupled; etc. For example, at the operating system level, the HH processing module 60 may be designated to respond to all interrupts, traps, and/or services calls and the invoke the partitioning of the EXT processing module 100 as needed. As another example, at the user level, the HH processing module 60 and the partitioning of the EXT processing module 100 may function in a symmetrical multiprocessing mode, in an asymmetrical multiprocessing mode, in a non-uniform memory access multiprocessing mode, and/or in a clustered multiprocessing mode.

With respect to instruction and data streams, the HH processing module 60 and the partitioning of the EXT processing module 100 may execute a single sequence of instructions in multiple contexts (single-instruction, multiple-data or SIMD), multiple sequences of instructions in a single context (multiple-instruction, single-data or MISD), or multiple sequences of instructions in multiple contexts (multiple-instruction, multiple-data or MIMD).

Each separate computing device 10 incorporates a virtual memory technique, overlays, and/or swapping to utilize the combined main memories and hard disk/flash memories for one or more user applications and/or system applications. In an embodiment, the virtual memory is divided into pages (e.g., a 4K-Byte block), where one or more page tables (e.g., one for the computing device, one for each running user application, etc.) translates virtual addresses into a physical addresses. Note that the memory control module 58 and/or 98 manages accesses to the one or more page tables to facilitate the fetching of data and/or instructions from physical memory. If a page table indicates that a page is not currently in main memory, the memory control module 58 and/or 98 raises a page fault interrupt.

A paging supervisor of the operating system receives the page fault interrupt and, in response, searches for the desired page containing the required virtual address. Once found, the paging supervisor reads the page into main memory and updates the appropriate page table. If there is insufficient room the main memory, the paging supervisor saves an area of the main memory to the HH or EXT hard disk/flash memory and updates the corresponding page table. The cleared area of main memory is then used for the new page.

With respect to user I/O devices, HH microphones, HH speakers, HH displays and HH keypads may be disabled while the handheld computing units are coupled to the EXT computing device as a separate computing device. In this mode, the EXT microphone 156, the EXT speaker 158, the EXT display 154, and the EXT keyboard/mouse 160 are active to provide, via the EXT IO interface 150 and the EXT graphics card 152 or the EXT graphics processing unit 148, the user interfaces to the separate or semi-separate computing device 10. Note that for a cellular voice telephone call from the transceiver 70, the inbound and outbound voice signals may be provided to/from the EXT microphone 156 and the speaker 158, an EXT headset (not shown), or the VoIP phone 46.

In this embodiment, two or more separate computing devices can be created from two or more HH computing units 12 sharing a single EXT computing unit 14. For example, two co-workers, each having his/her own HH computing unit 12 could share a single EXT computing unit 14. Yet, to each user, the single EXT unit-multiple HH unit configuration appears as separate computing devices. As another example, two family members, each having its own HH computing unit, may share a single EXT computing unit. As yet another example, two or more video game players, each having its own HH computing unit, may share a single EXT unit 14 to play video games. In this instance, the HH units and the EXT unit would be re-configured into the semi-separate computing devices such that they can share the video game software and execution thereof, yet maintain separate functionality for other applications, features, and/or functions.

Figure 16:
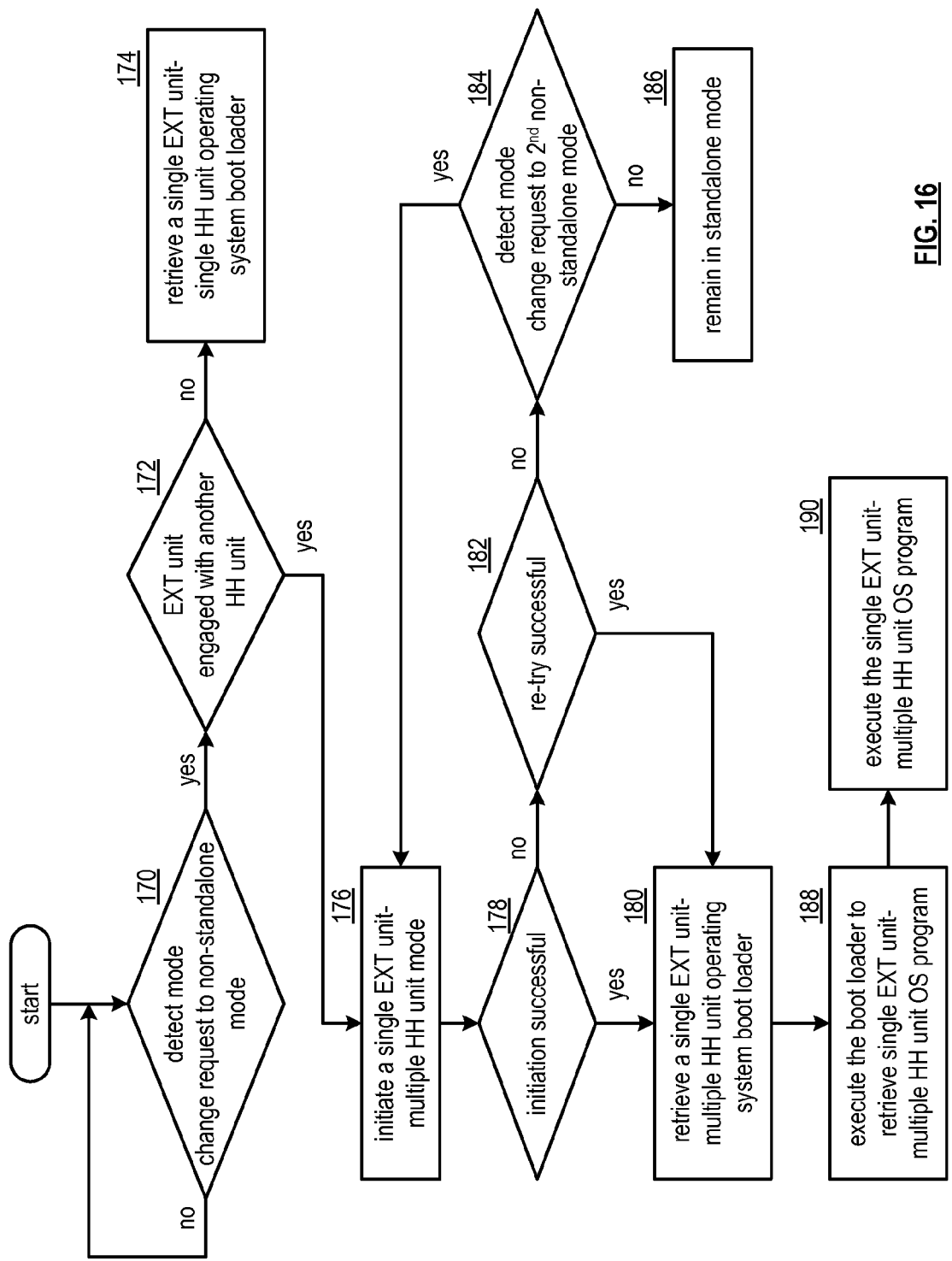
FIG. 16 is a logic diagram of a method for a handheld computing unit to establish a single extended computing unit-multiple handheld computing unit mode in accordance with the present invention.

FIG. 16 is a logic diagram of a method for a handheld computing unit 12 to establish a single extended computing unit-multiple handheld computing unit mode. The method begins at step 170 where the HH unit determines whether it detects a module change request to a non-standalone mode (e.g., the integrated computing device, the separate computing devices, or the semi-separate computing devices of the single EXT unit-multiple HH units mode). Once the mode change request is detected, the method continues at step 172 where the HH unit determines whether the EXT unit is engaged with another HH unit. This may be done via a query and response between the HH unit and the EXT unit.

If the EXT unit is not engaged (e.g., not in a single EXT-single HH unit mode and not in a single EXT-multiple HH mode), the method continues at step 174 where the HH computing unit retrieves a single EXT unit-single HH unit operating system boot loader. The HH unit then executes the boot loader to load a single EXT unit-single HH unit operating system. This was discussed in detail in the parent patent application, which is incorporated herein by reference.

If the EXT unit is engaged with another HH unit, the method continues at step 176 where the HH unit initiates a single EXT unit-multiple HH unit mode. This may be done in a variety of ways. For example, the HH unit may generate a message requesting re-configuration into a single extended computing unit-multiple handheld computing unit mode. The message may further specify whether to reconfigure into the integrated computing device mode, the separate computing devices mode, or the semi-separate computing devices mode. The HH unit then transmits the message to the other handheld computing unit and/or to the extended computing unit. Within some prescribed time frame, the other HH unit and/or the EXT unit provides a response to the request message. The HH unit interprets the response, which may be a denial, a wait message, or an affirmative acknowledgement. Note that a lack of a specific response within a given time frame from the other HH unit constitutes a denial. When the response is an affirmative acknowledgement of the message, the HH unit generates an indication that the initiation was successful.

The method continues at step 178 where the HH unit determines whether the initiation is successful. If the initiation was successful, the method continues at step 180 where the HH unit retrieves a single extended computing unit-multiple handheld computing unit operating system boot loader. The method then continues at step 188 where the HH unit executes the single extended computing unit-multiple handheld computing unit operating system boot loader to retrieve a single extended computing unit-multiple handheld computing unit operating system program. The method then continues at step 190 where the HH unit executes the single extended computing unit-multiple handheld computing unit operating system program in concert with the other handheld computing unit and the extended computing unit executing corresponding single extended computing unit-multiple handheld computing unit operating system programs.

If, at step 178, the initiation was not successful, the method continues at step 182 where the HH unit engages a re-try mechanism (e.g., repeat sending the request message for three times over the next five minutes). If the re-try is successful, the method continues at step 180. If the re-try was not successful, the method continues at step 184 where the HH unit determines whether it detects a second mode change request to a second non-standalone mode (e.g., the user or an automated process opts for a different configuration: an integrated computing device, separate computing devices, or semi-separate computing devices). If not, the method continues at step 186 where the HH unit remains in the stand-alone mode. This mode was described as the remote mode in the parent patent application.

If the different mode change is detected, the method repeats at step 176 for the new mode. For instance, the HH unit initiates another type of single extended computing unit-multiple handheld computing unit mode in accordance with the second non-standalone mode. When the initiation of the another type of single extended computing unit-multiple handheld computing unit mode is successful, the HH unit retrieves a second single extended computing unit-multiple handheld computing unit operating system boot loader.

Figure 17:
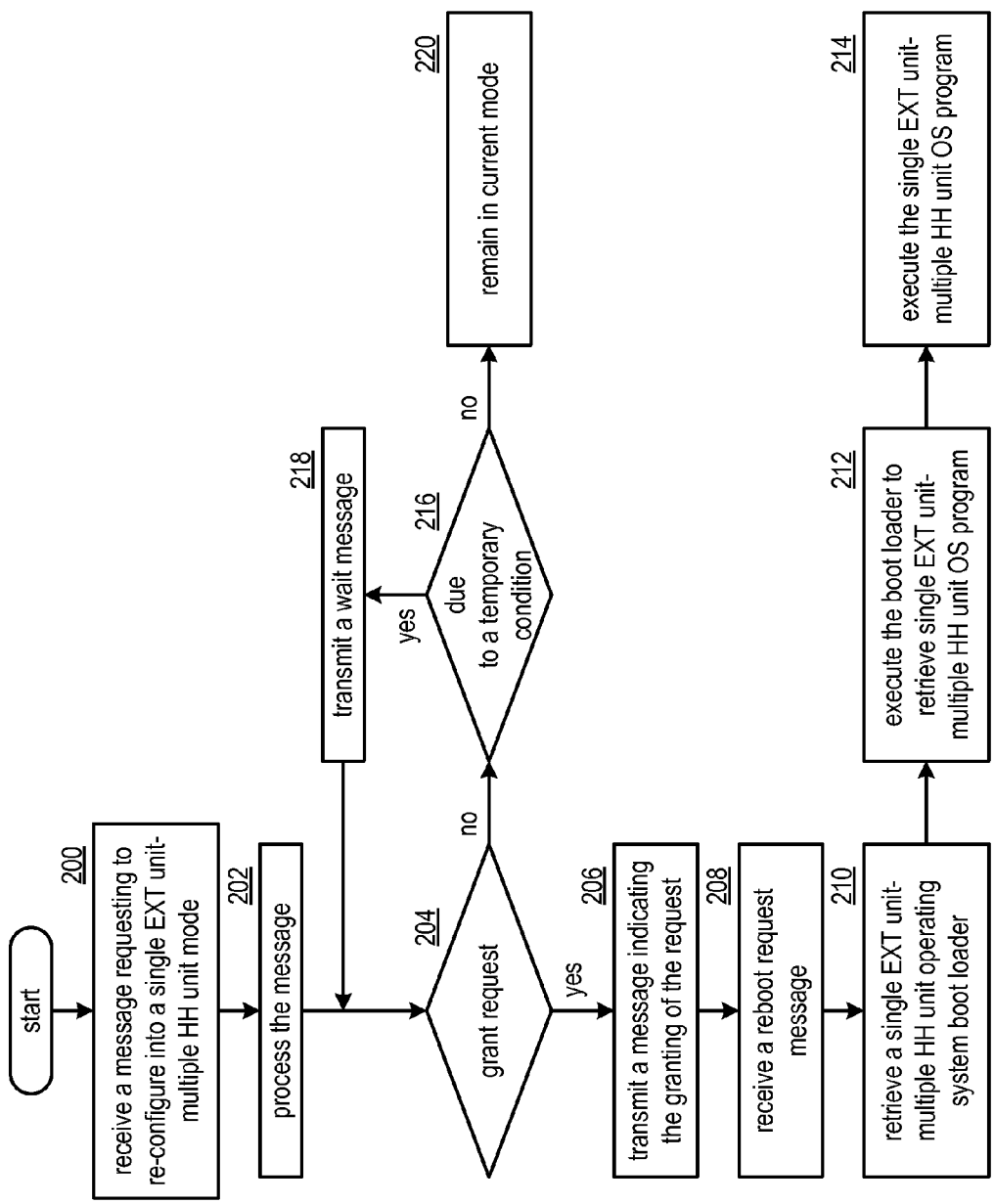
FIG. 17 is a logic diagram of a method for a handheld computing unit to participate in a single extended computing unit-multiple handheld computing unit mode in accordance with the present invention.

FIG. 17 is a logic diagram of a method for a handheld computing unit to participate in a single extended computing unit-multiple handheld computing unit mode. The method begins at step 200 where the HH unit receives a message requesting to re-configure into a single extended computing unit-multiple handheld computing unit mode (e.g., into an integrated computing device, separate computing devices, or semi-separate computing devices).

The method continues at step 202 where the HH unit processes the message to determine whether to grant the request to re-configure. The processing may be done in a variety of ways. For example, the processing may be done by determining whether the single extended computing unit-multiple handheld computing unit mode is an enabled feature. In other words, is the HH unit capable of participating in the requested single EXT unit-multiple HH unit configuration (e.g., integrated, separate, or semi-separate devices). When the single extended computing unit-multiple handheld computing unit mode is enabled, the HH unit grants the request to re-configure.

The HH unit may not grant the request even though it is capable of re-configuring into the requested single EXT unit-multiple HH unit mode due to a temporary condition. For example, the HH unit may be performing a system application that cannot be interrupted, may be performing a user application that the user does not want to terminate, etc.

The method branches at step 204 depending on whether the HH unit grants the request. If yes, the method continues at step 206 where the HH unit transmits a message indicating the granting of the request. The method continues at step 208 where the HH unit receives a reboot request message in response to the message indicating the granting of the request. As an alternative, the message indicating the granting of the request could include a reboot request.

The method continues at step 210, the HH unit retrieves a single extended computing unit-multiple handheld computing unit operating system boot loader. The method continues at step 212 where the HH unit executes the single extended computing unit-multiple handheld computing unit operating system boot loader to retrieve a single extended computing unit-multiple handheld computing unit operating system program. The method continues at step 214 where the HH unit executes the single extended computing unit-multiple handheld computing unit operating system program in concert with another handheld computing unit and an extended computing unit executing corresponding single extended computing unit-multiple handheld computing unit operating system programs.

In one embodiment, for the executing of the single extended computing unit-multiple handheld computing unit OS program, the HH unit functions as the dominate handheld computing unit to initiate the execution of the single extended computing unit-multiple handheld computing unit operating system program and to initiate the execution of the corresponding single extended computing unit-multiple handheld computing unit operating system program by the other handheld computing unit. In another embodiment, for the executing the single extended computing unit-multiple handheld computing unit operating system program, the HH unit receives instructions from the other handheld computing unit regarding execution of the single extended computing unit-multiple handheld computing unit operating system program.

If, at step 204, the request is not granted, the method continues at step 216 where the HH unit determines whether the non-granting of the request was due to a temporary condition. If not, the method continues at step 220 where the HH unit remains in the current mode. If, however, the request was not granted due to a temporary condition, the method continues at step 218 where the HH unit transmits a wait message, wherein the wait message indicates that the HH unit is willing to re-configure, but it needs to complete some tasks before re-configuring. The message may also include an indication for the duration of a wait period.

Figure 18:
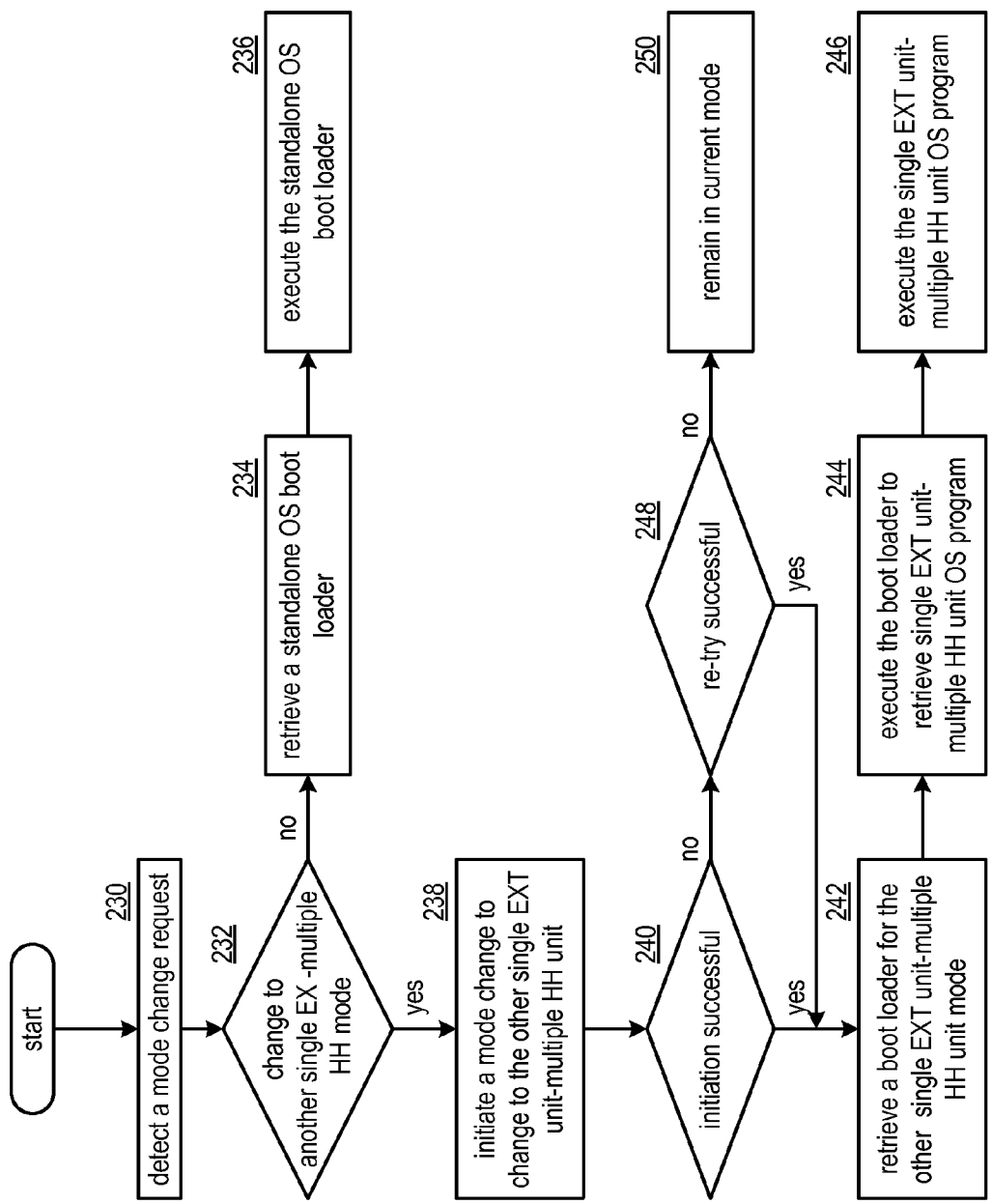
FIG. 18 is a logic diagram of a method for a handheld computing unit to change from a single extended computing unit-multiple handheld computing unit mode in accordance with the present invention.

FIG. 18 is a logic diagram of a method for a handheld computing unit to change from a single extended computing unit-multiple handheld computing unit mode. The method begins at step 230 where the HH unit detects (e.g., user initiated or automatic) a mode change request from a current single extended computing unit-multiple handheld computing unit mode to a standalone mode or to another single extended computing unit-multiple handheld computing unit mode. The method continues at step 232 where the HH unit determines whether to change another single EXT unit-multiple HH unit mode or to a standalone mode.

When the mode change request is to change to the other single extended computing unit-multiple handheld computing unit mode, the method continues at step 238 where the HH unit initiates a mode change to change to the other single extended computing unit-multiple handheld computing unit. The initiation may be done in a variety of ways. For example, the HH unit may generate a message requesting re-configuration into the other single extended computing unit-multiple handheld computing unit mode. The HH unit then transmits the message to the other handheld computing unit and/or the extended computing unit. Upon receiving a response, the HH unit interprets it. When the response is an affirmative acknowledgement of the message, the HH unit generates an indication that the initiation of the mode change was successful.

When, at step 240, the initiation of the mode change is successful, the method continues at step 242 where the HH unit retrieves a single extended computing unit-multiple handheld computing unit operating system boot loader for the other single extended computing unit-multiple handheld computing unit mode. The method continues at step 244 where the HH unit executes the single extended computing unit-multiple handheld computing unit operating system boot loader to retrieve a single extended computing unit-multiple handheld computing unit operating system program. The method continues at step 246 where the HH unit executes the single extended computing unit-multiple handheld computing unit operating system program in concert with the other handheld computing unit and the extended computing unit executing corresponding single extended computing unit-multiple handheld computing unit operating system programs.

If, at step 240, the initiation was not successful, the method continues at step 248 where the HH unit engages a re-try mechanism (e.g., repeat sending the request message for three times over the next five minutes). If the re-try is successful, the method continues at step 242. If the re-try was not successful, the method continues at step 250 where the HH unit remains in the current mode.

If, at step 232, the mode change is for a standalone mode, the method continues at step 234 where the HH unit retrieves a standalone operating system boot loader. The method continues at step 236 where the HH unit executes the standalone operating system boot loader to reboot in the standalone mode.

Figure 19:
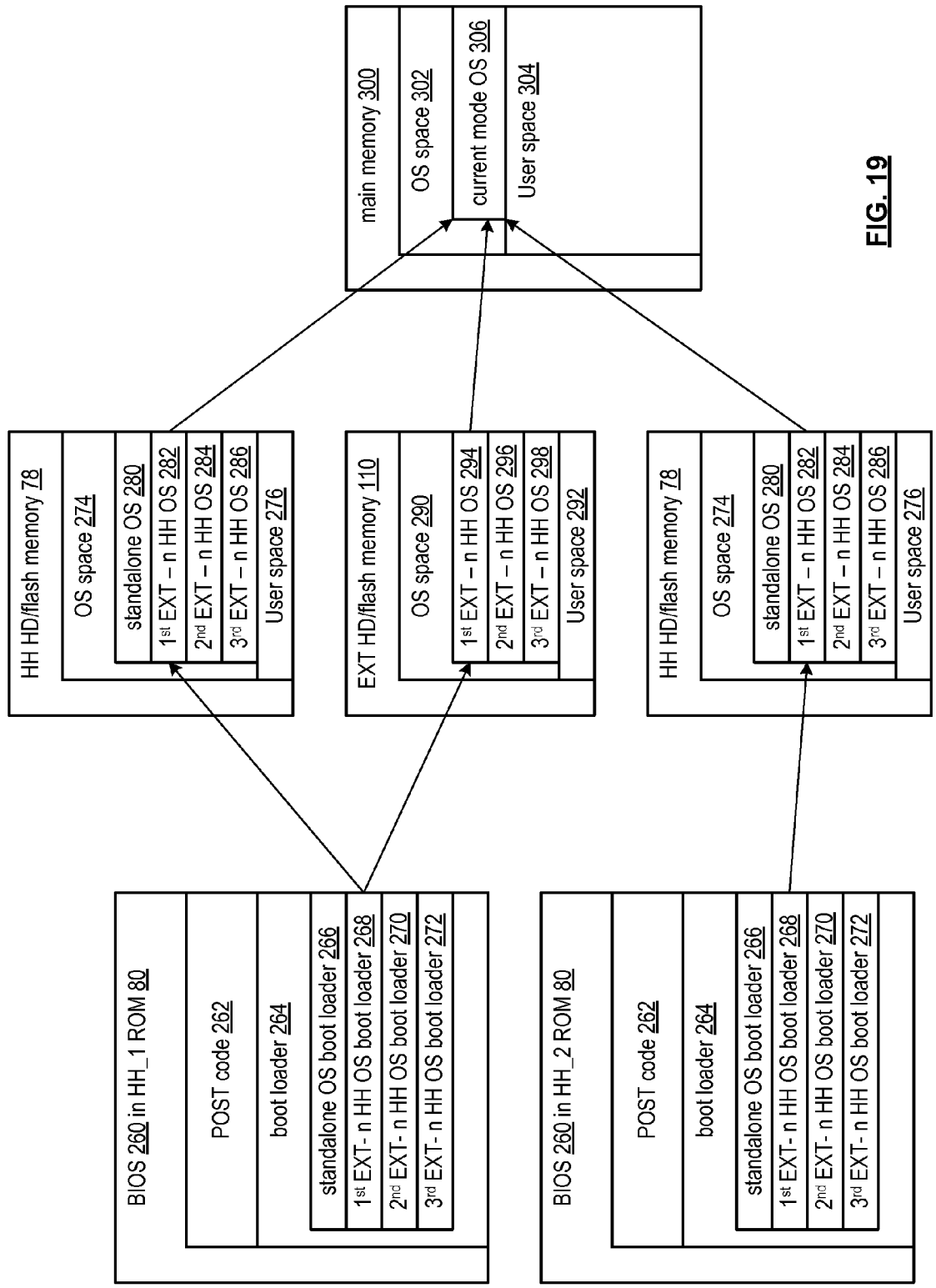
FIG. 19 is a diagram of an example of a handheld computing unit establishing a single extended computing unit-multiple handheld computing unit mode in accordance with the present invention.

FIG. 19 is a diagram of an example of a handheld computing unit establishing a single extended computing unit-multiple handheld computing unit. In this example, each of the HH units accesses its BIOS 260, which is stored in ROM 80 of the corresponding handheld computing unit 12. The BIOS 260 includes a power on self test (POST) code section 262 and a boot loader section 264, which includes a standalone mode operating system boot loader section 266, a first single EXT unit-multiple HH unit mode operating system boot loader section 268 (e.g., integrated computing device), a second single EXT unit-multiple HH unit mode operating system boot loader section 270 (e.g., separate computing devices), a third single EXT unit-multiple HH unit mode operating system boot loader section 272 (e.g., semi-separate computing devices), and may further includes a single EXT unit-single HH unit mode operating system boot loader section (which was referred to as a docked mode in the parent patent application).

In this example, the HH hard disk/flash memory 78 includes an operating system space 274 and a user space 276. The OS space 274 includes a standalone mode operating system program 280, a first single EXT unit-multiple HH unit mode operating system program 282 (e.g., integrated computing device), a second single EXT unit-multiple HH unit mode operating system program 284 (e.g., separate computing devices), a third single EXT unit-multiple HH unit mode operating system program 286 (e.g., semi-separate computing devices), and may further includes a single EXT unit-single HH unit mode operating system program.

The EXT hard disk/flash memory 110 includes an OS space 290 and a user space 290, which may be partitioned or shared by the resulting computing devices. The OS space 290 includes a first single EXT unit-multiple HH unit mode operating system program 294 (e.g., integrated computing device), a second single EXT unit-multiple HH unit mode operating system program 296 (e.g., separate computing devices), a third single EXT unit-multiple HH unit mode operating system program 298 (e.g., semi-separate computing devices), and may further includes a single EXT unit-single HH unit mode operating system program.

In this example, the HH units and the EXT unit are to re-configure into an integrated computing device. As such, the HH units retrieve the first single EXT unit-multiple HH unit mode operating system boot loader section 268 and execute the boot loader to retrieve the first single EXT unit-multiple HH unit mode operating system program 282 from memory. In addition, one of the boot loaders 268 causes the first single EXT unit-multiple HH unit mode operating system program 294 to be retrieved from the EXT memory 110. The retrieved OS programs 282 and 294 are executed and stored in the main memory of the integrated computing device.

As shown, the main memory 300 (which includes the main memory of the HH units and of the EXT unit) includes an operating system space 302, and a user space 304. The operating system space 302 stores the current version of the operating system 306. In this example, the current version of the operating system is the integrated computing device. From this example, it should be fairly apparent how the other modes may be activated.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A handheld computing unit comprises:
a hardware section; and
memory that includes an application section and an operating system section, wherein the operating system section includes operational instructions that cause the hardware section to:
retrieve a boot loader to install operating system software to support operations in a standalone mode;
operate in a standalone mode;
detect a mode change request to a non-standalone mode;
determine whether an extended computing unit is engaged with another handheld computing unit;
when the extended computing unit is engaged with another handheld unit, initiate a single extended computing unit-multiple handheld computing unit mode; and
when the initiation is successful, retrieve a single extended computing unit-multiple handheld computing unit operating system boot loader to support operations in the single extended computing unit-multiple handheld computing unit mode.

2. The handheld computing unit of claim 1, wherein the operating system section further comprises operational instructions that cause the hardware section to initiate the single extended computing unit-multiple handheld computing unit mode by:
generating a message requesting re-configuration into a single extended computing unit-multiple handheld computing unit mode; and
transmitting the message to at least one of: the other handheld computing unit and the extended computing unit.

3. The handheld computing unit of claim 2, wherein the operating system section further comprises operational instructions that cause the hardware section to:
interpret a response to the message; and
when the response is an affirmative acknowledgement of the message, generate an indication that the initiation was successful.

4. The handheld computing unit of claim 1, wherein, when the initiations was unsuccessful, the operating system section further comprises operational instructions that cause the hardware section to:
detect a second mode change request to a second non-standalone mode;
initiate another type of single extended computing unit-multiple handheld computing unit mode in accordance with the second non-standalone mode; and
when the initiation of the another type of single extended computing unit-multiple handheld computing unit mode is successful, retrieve a second single extended computing unit-multiple handheld computing unit operating system boot loader.

5. The handheld computing unit of claim 1, wherein the operating system section further comprises operational instructions that cause the hardware section to:
execute the single extended computing unit-multiple handheld computing unit operating system boot loader to retrieve a single extended computing unit-multiple handheld computing unit operating system program; and
execute the single extended computing unit-multiple handheld computing unit operating system program in concert with the other handheld computing unit and the extended computing unit executing corresponding single extended computing unit-multiple handheld computing unit operating system programs.

6. The handheld computing unit of claim 1, wherein the single extended computing unit-multiple handheld computing unit mode comprises:
separate computing units mode;
integrated computing unit mode; and
semi-separate computing units mode.

7. The handheld computing unit of claim 1, wherein the hardware section comprises:
a memory control module;
a processing module coupled to the memory control module;
a peripheral component interface module coupled to the memory control module;
a radio frequency transceiver coupled to the peripheral component interface module;
a host controller coupled to the peripheral component interface and to a hard disk/flash memory unit;
an input/output (TO) controller coupled to the memory control module; and
an IO interface coupled to the IO controller.

8. A handheld computing unit comprises:
a hardware section; and
memory that includes an application section and an operating system section, wherein the operating system section includes operational instructions that cause the hardware section to:
retrieve a boot loader to install operating system software to support operations in a standalone mode;
operate in a standalone mode;
receive a message requesting to re-configure into a single extended computing unit-multiple handheld computing unit mode;
process the message to determine whether to grant the request to re-configure;
when the request to re-configure is granted, transmit a message indicating the granting of the request;
receive a reboot request message m response to the message indicating the granting of the request; and
in response to the reboot request message, retrieve a single extended computing unit-multiple handheld computing unit operating system boot loader.

9. The handheld computing unit of claim 8, wherein the processing of the message comprises:
determining whether the single extended computing unit-multiple handheld computing unit mode is an enabled feature; and
when the single extended computing unit-multiple handheld computing unit mode is enabled, granting the request to re-configure.

10. The handheld computing unit of claim 9 further comprises:
the single extended computing unit-multiple handheld computing unit mode includes a separate computing units mode, an integrated computing unit mode, and a semi-separate computing units mode, wherein the determining whether the single extended computing unit-multiple handheld computing unit is an enabled feature is based on a type of the single extended computing unit-multiple handheld computing unit mode.

11. The handheld computing unit of claim 9 further comprises:
when the single extended computing unit-multiple handheld computing unit is not an enabled feature due to a temporary condition, generate a wait message; and transmit the wait message to a requesting handheld computing unit.

12. The handheld computing unit of claim 8, wherein the operating system section further comprises operational instructions that cause the hardware section to:
   execute the single extended computing unit-multiple handheld computing unit operating system boot loader to retrieve a single extended computing unit-multiple handheld computing unit operating system program; and
   execute the single extended computing unit-multiple handheld computing unit operating system program in concert with another handheld computing unit and an extended computing unit executing corresponding single extended computing unit-multiple handheld computing unit operating system programs.

13. The handheld computing unit of claim 12, wherein the executing the single extended computing unit-multiple handheld computing unit operating system program comprises:
   functioning as a dominate handheld computing unit to initiate the execution of the single extended computing unit-multiple handheld computing unit operating system program and to initiate the execution of the corresponding single extended computing unit-multiple handheld computing unit operating system program by the other handheld computing unit.

14. The handheld computing unit of claim 12, wherein the executing the single extended computing unit-multiple handheld computing unit operating system program comprises:
   receiving instructions from the other handheld computing unit regarding execution of the single extended computing unit-multiple handheld computing unit operating system program.

15. The handheld computing unit of claim 8, wherein the hardware section comprises:
   a memory control module;
   a processing module coupled to the memory control module;
   a peripheral component interface module coupled to the memory control module;
   a radio frequency transceiver coupled to the peripheral component interface module;
   a host controller coupled to the peripheral component interface and to a hard disk/flash memory unit;
   an input/output (TO) controller coupled to the memory control module; and
   an IO interface coupled to the IO controller.

16. A handheld computing unit comprises:
   a hardware section; and
   memory coupled to the hardware section, wherein the memory includes an application section and an operating system section, wherein the operating system section includes operational instructions that cause the hardware section to:
   detect a mode change request from a current single extended computing unit-multiple handheld computing unit mode to a standalone mode or to another single extended computing unit-multiple handheld computing unit mode;
   when the mode change request is to change to the other single extended computing unit-multiple handheld computing unit mode, initiate a mode change to change to the other single extended computing unit-multiple handheld computing unit; and
   when the initiation of the mode change is successful, retrieve a single extended computing unit-multiple handheld computing unit operating system boot loader for the other single extended computing unit-multiple handheld computing unit mode.

17. The handheld computing unit of claim 16, wherein the operating system section further comprises operational instructions that cause the hardware section to:
   when the mode change request is to change to the standalone mode, retrieve a standalone operating system boot loader; and
   execute the standalone operating system boot loader to reboot in the standalone mode.

18. The handheld computing unit of claim 16, wherein the operating system section further comprises operational instructions that cause the hardware section to initiate the single extended computing unit-multiple handheld computing unit mode by:
   generating a message requesting re-configuration into the other single extended computing unit-multiple handheld computing unit mode; and
   transmitting the message to at least one of: the other handheld computing unit and the extended computing unit.

19. The handheld computing unit of claim 18, wherein the operating system section further comprises operational instructions that cause the hardware section to:
   interpret a response to the message; and
   when the response is an affirmative acknowledgement of the message, generate an indication that the initiation of the mode change was successful.

20. The handheld computing unit of claim 16, wherein the operating system section further comprises operational instructions that cause the hardware section to:
   execute the single extended computing unit-multiple handheld computing unit operating system boot loader to retrieve a single extended computing unit-multiple handheld computing unit operating system program; and
   execute the single extended computing unit-multiple handheld computing unit operating system program in concert with the other handheld computing unit and the extended computing unit executing corresponding single extended computing unit-multiple handheld computing unit operating system programs.

* * * * *

UNITED STATES PATENT AND TRADEMARK OFFICE
CERTIFICATE OF CORRECTION

PATENT NO. : 8,359,373 B2  
APPLICATION NO. : 12/431475  
DATED : January 22, 2013  
INVENTOR(S) : Ahmadreza Rofougaran Page 1 of 1

It is certified that error appears in the above-identified patent and that said Letters Patent is hereby corrected as shown below:

In the Claims

Col. 29, line 21, in claim 13: replace "dominate" with --dominant--

Signed and Sealed this  
Third Day of December, 2013

Margaret A. Focarino  
*Commissioner for Patents of the United States Patent and Trademark Office*